US008787717B2

(12) United States Patent
Logunov

(10) Patent No.: US 8,787,717 B2
(45) Date of Patent: Jul. 22, 2014

(54) SYSTEMS AND METHODS FOR COUPLING LIGHT INTO A TRANSPARENT SHEET

(75) Inventor: Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 454 days.

(21) Appl. No.: 13/094,221

(22) Filed: Apr. 26, 2011

(65) Prior Publication Data

US 2012/0275745 A1 Nov. 1, 2012

(51) Int. Cl.
*G02B 6/30* (2006.01)
*G02B 6/26* (2006.01)
*G02B 6/10* (2006.01)
*G02B 6/032* (2006.01)

(52) U.S. Cl.
USPC ............... 385/49; 385/31; 385/32; 385/125; 385/129

(58) Field of Classification Search
None
See application file for complete search history.

(56) References Cited

U.S. PATENT DOCUMENTS

| | | | |
|---|---|---|---|
| 4,422,719 A * | 12/1983 | Orcutt | 385/123 |
| 4,466,697 A * | 8/1984 | Daniel | 385/123 |
| 4,642,736 A | 2/1987 | Masuzawa et al. | |
| 4,733,929 A * | 3/1988 | Brown | 385/31 |
| 5,101,325 A | 3/1992 | Davenport et al. | |
| 5,664,862 A | 9/1997 | Redmond et al. | |
| 6,123,442 A * | 9/2000 | Freier et al. | 362/559 |
| 6,169,836 B1 * | 1/2001 | Sugiyama et al. | 385/123 |
| 6,234,656 B1 * | 5/2001 | Hosseini et al. | 362/556 |
| 6,361,180 B1 | 3/2002 | Limura | |
| 6,404,471 B1 | 6/2002 | Hatanaka et al. | |
| 6,714,711 B1 * | 3/2004 | Lieberman et al. | 385/124 |
| 6,796,700 B2 | 9/2004 | Kraft | |
| 7,048,401 B2 | 5/2006 | Lee | |
| 7,450,806 B2 | 11/2008 | Bookbinder et al. | |
| 7,682,062 B2 | 3/2010 | Stadtwald-Klenke | |
| 2003/0123261 A1 * | 7/2003 | Muthu et al. | 362/555 |
| 2005/0185395 A1 | 8/2005 | Pinter | |
| 2007/0097108 A1 | 5/2007 | Brewer | |
| 2007/0098969 A1 | 5/2007 | Ansems et al. | |
| 2008/0304791 A1 | 12/2008 | Takatori et al. | |
| 2009/0027587 A1 | 1/2009 | Itoh et al. | |
| 2010/0238374 A1 * | 9/2010 | Ohse | 349/61 |
| 2011/0122646 A1 | 5/2011 | Bickham et al. | |

OTHER PUBLICATIONS

Jul. 26, 2012 International Search Report issued for related application No. PCT/US2012/032996.
Aug. 3, 2012 International Search Report issued for counterpart application No. PCT/US2012/033006.

* cited by examiner

Primary Examiner — Michelle R Connelly
(74) Attorney, Agent, or Firm — Svetlana Short

(57) ABSTRACT

Systems and methods for coupling light into a transparent sheet. The systems include a light source and a light-diffusing optical fiber optically coupled to the light source. The light-diffusing optical fiber has a core, a cladding and a length, with at least a portion of the core comprising randomly arranged voids configured to provide substantially continuous light emission from the core and out of the cladding along at least a portion of the length, and into the transparent sheet.

12 Claims, 21 Drawing Sheets

SYSTEMS AND METHODS FOR COUPLING LIGHT INTO A TRANSPARENT SHEET

FIELD

The disclosure is generally directed to coupling light into an optical medium, and in particular relates to systems and methods for coupling light into a transparent sheet.

BACKGROUND

There is an increasing variety of electronic-based devices that utilize flat-screen displays. Such devices range in size from the largest flat-screen televisions to the smallest hand-held devices such as cell-phones.

In certain types of flat-screen displays, a light source provides the light needed to view the display. For example, in one type of liquid-crystal display, an addressable liquid-crystal display structure is backlit with a light source and employs crossed polarizers on either side of the structure. Other types of flat-screen displays are reflective displays (e.g., reflective liquid crystal displays) that operate without backlighting or without an external light source and instead use ambient light.

While reflective displays that utilize ambient light are appealing for certain applications (e.g., so-called e-book applications), these displays are not functional in a dark environment and require an external light source. However, the external light source is preferably configured to maintain the compactness of the display while also providing light with sufficient uniformity and intensity to make the display readable.

SUMMARY

An embodiment of the invention is a system for coupling light into a transparent sheet. The system includes a light source that generates light, and a light-diffusing optical fiber. The light-diffusing optical fiber is optically coupled to the light source and is arranged adjacent the transparent sheet. The light-diffusing optical fiber has a core, a cladding and a length. The core includes randomly arranged voids configured to provide substantially continuous light emission from the core and out of the cladding and into the transparent sheet.

Another embodiment of the disclosure is a system for coupling light into a transparent sheet having an edge and a surface. The system includes a light source that generates light, and also includes at least one light-diffusing optical fiber optically coupled to the light source. The at least one light-diffusing optical fiber has a core, a cladding and a length. At least a portion of the core comprises randomly arranged voids configured to provide substantially continuous light emission from the core and out of the cladding along at least a portion of the length. The system also includes the transparent sheet, with the portion of the at least one optical fiber arranged adjacent at least one of the edge and the surface of the transparent sheet so that light from the optical fiber portion enters the transparent sheet.

Another embodiment of the invention is a method of coupling light into a transparent sheet having an edge and a surface. The method includes disposing at least a portion of at least one light-diffusing optical fiber adjacent at least one of the edge and the surface of the transparent sheet. The at least one light-diffusing optical fiber has a core, a cladding and a length. At least a portion of the core includes randomly arranged voids configured to provide substantially continuous light emission from the core and out of the cladding along at least a portion of the length of the light-diffusing optical fiber. The method also includes sending light down the at least one light-diffusing optical fiber so that light from the portion of the light-diffusing optical fiber enters the transparent sheet.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference is now made in detail to the embodiments of the disclosure, examples of which are illustrated in the accompanying drawings. Whenever possible, like reference numbers are used to refer to like components or parts. Cartesian coordinates are shown in some of the Figures by way of reference.

Figure 1:
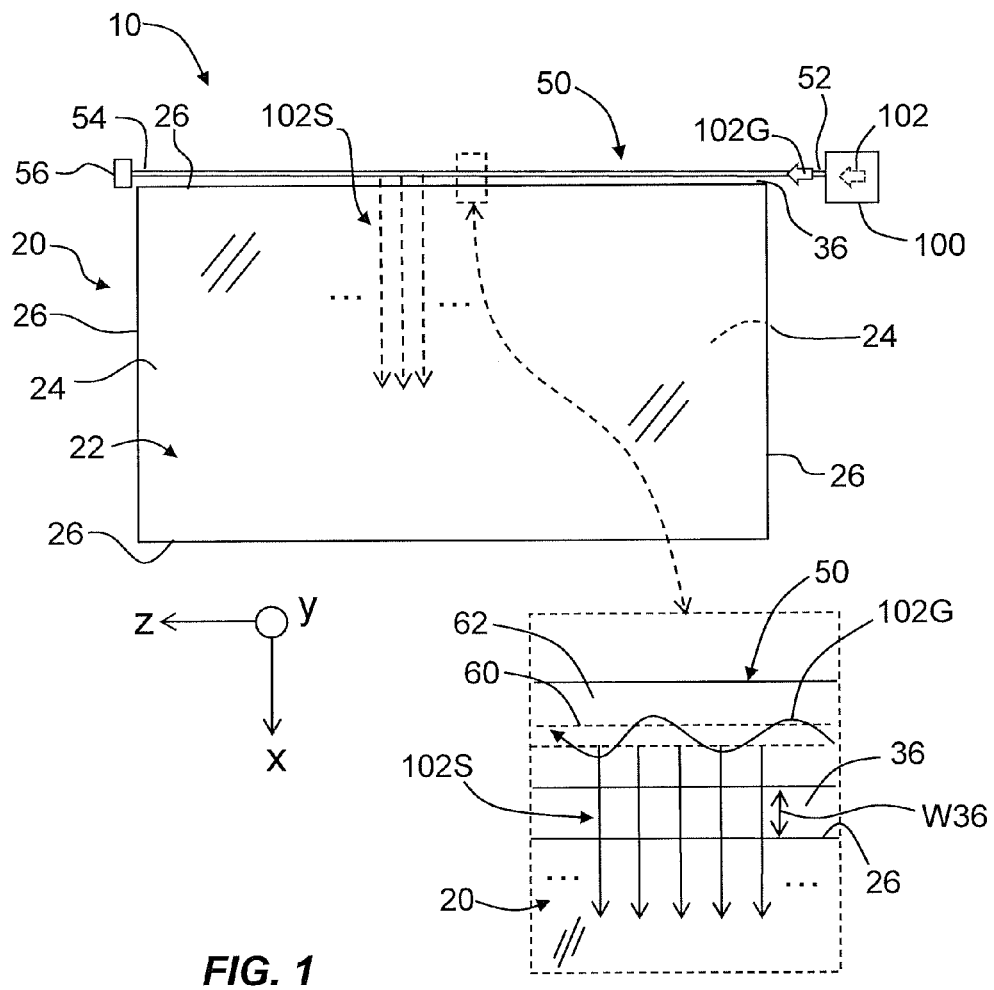
FIG. 1 is a top-down view of an example light-coupling optical system according to the disclosure.
Figure 2:
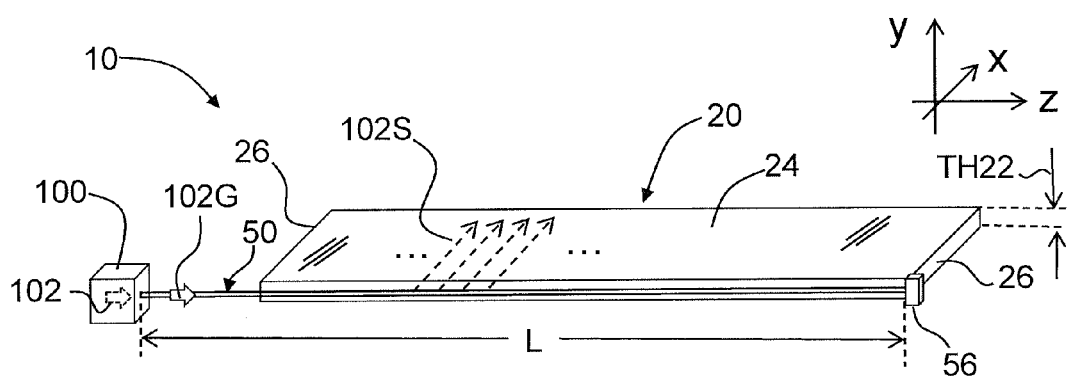
FIG. 2 is an elevated view of the light-coupling optical system of FIG. 1.

FIG. 1 is a top-down view of an example light-coupling optical system ("system") 10 according to the disclosure. FIG. 2 is an elevated view of the light-coupling optical system of FIG. 1. System 10 generally includes a transparent sheet 20, a light-diffusing optical fiber 50 operably disposed adjacent the transparent sheet, and a light source 100 optically coupled to the light-diffusing optical fiber. In an example, light source 100 comprises at least one light-emitting diode (LED) or at least one diode laser. Light source 100 emits light 102 that in one example is in the wavelength range from 350 nm to 1,000 nm, while in another example is in the visible wavelength range, e.g., from 380 nm (violet) nm to 750 nm (red).

Transparent sheet 20 has a body 22 that defines a thickness TH22, opposite top and bottom substantially planar and substantially parallel surfaces 24, and one or more edges 26, such as four edges 26 for a rectangular transparent sheet. Transparent sheet 20 can be made of, for example, glass, plastic, display glass such as Corning's EAGLE XG®, EAGLE® and Gorilla® and PYREX® glasses, as well as fused silica, plastic materials like PPMA or any other transparent material. Here, the term "transparent" generally means that the transparent sheet transmits light 102 at least in the visible wavelength range, and transmits more light than it absorbs for the given thickness TH22 of transparent sheet body 22.

In an example, the thickness TH22 of transparent sheet body 22 is 0.3 mm or greater, and in another example is 0.7 mm or greater. In an example, transparent sheet body 22 has a refractive index of about 1.5 or greater at 550 nm. Also in an example, one or more of top and bottom surfaces 24 may be rough surfaces with a roughness designed to scatter light 102.

System 10 includes at least one light-diffusing optical fiber 50. The term "light-diffusing" means that light scattering is substantially continuous along the length of the light-diffusing optical fiber 50, i.e., there are no jumps or discontinuities such as associated with discrete (e.g., point) scattering.

In an example, light-diffusing optical fiber 50 includes a coupling end 52 and a terminal end 54. Coupling end 52 and terminal end 54 define a length L for light-diffusing optical fiber 50. Coupling end 52 is optically coupled to light source 100 so that light 102 from the light source travels in light-diffusing optical fiber 50 as guided light 102G. Light-diffusing optical fiber 50 is disposed adjacent at least one of transparent sheet edge 26 and transparent sheet surface 24. In an example, a terminal optical member 56 is operably disposed adjacent terminal end 54 of light-diffusing optical fiber 50. In one example, terminal optical member 56 is an optical absorber that absorbs light 102, while in another example it is an optical reflector that reflects light 102 (e.g., guided light 102G) so that the reflected guided light travels down the optical fiber 50 in the opposite direction, i.e., toward light source 100. In such an example, an optical isolator (not shown) may be employed to prevent light 102 from returning to light source 100.

Figure 3A:
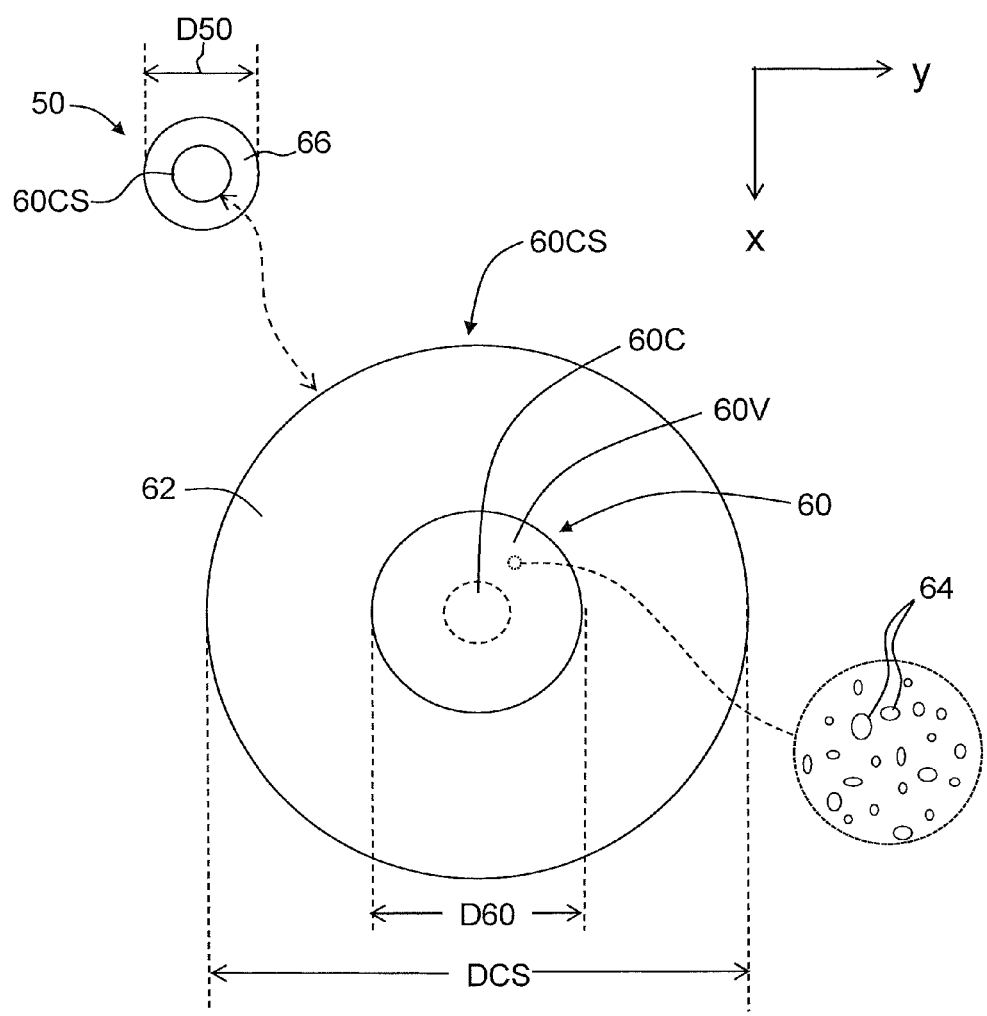
FIG. 3A is a cross-sectional view of an example light-diffusing optical fiber, including a detailed cross-sectional view of the central core section (core)

FIG. 3A is a cross-sectional view of an example light-diffusing optical fiber 50 having a central core section ("core") 60CS, and an outer cladding 66, and showing in detail an example configuration for the core. Light-diffusing optical fiber 50 includes a center (or inner) core region 60 having a diameter D60, and an outer core region 62 that at least partially surrounds the center core region. The center core region 60 includes a central clear (solid) region 60C surrounded by an annular void region 60V that includes randomly arranged and randomly sized voids 64, as illustrated in the inset of FIG. 3. Light-diffusing optical fiber 50 also includes a cladding region 66 that surrounds core 60CS. In an example, cladding region 66 is made of low-index polymer while core 60CS comprises silica.

Examples of light-diffusing optical fibers having randomly arranged and randomly sized voids 64 (also referred to as "random air lines") is described in U.S. Pat. No. 7,450,8706, which patent is incorporated by reference herein.

In an example, central clear region 60C has a nominal refractive index of about 1.46 at a wavelength of 550 nm. Also in an example, core diameter DCS is in the range from about 125 microns to 300 microns. Further in an example, the diameter D50 of light-diffusing optical fiber 50 is in the range from 0.2 mm (200 microns) to 0.25 mm (250 microns).

Figure 3B:
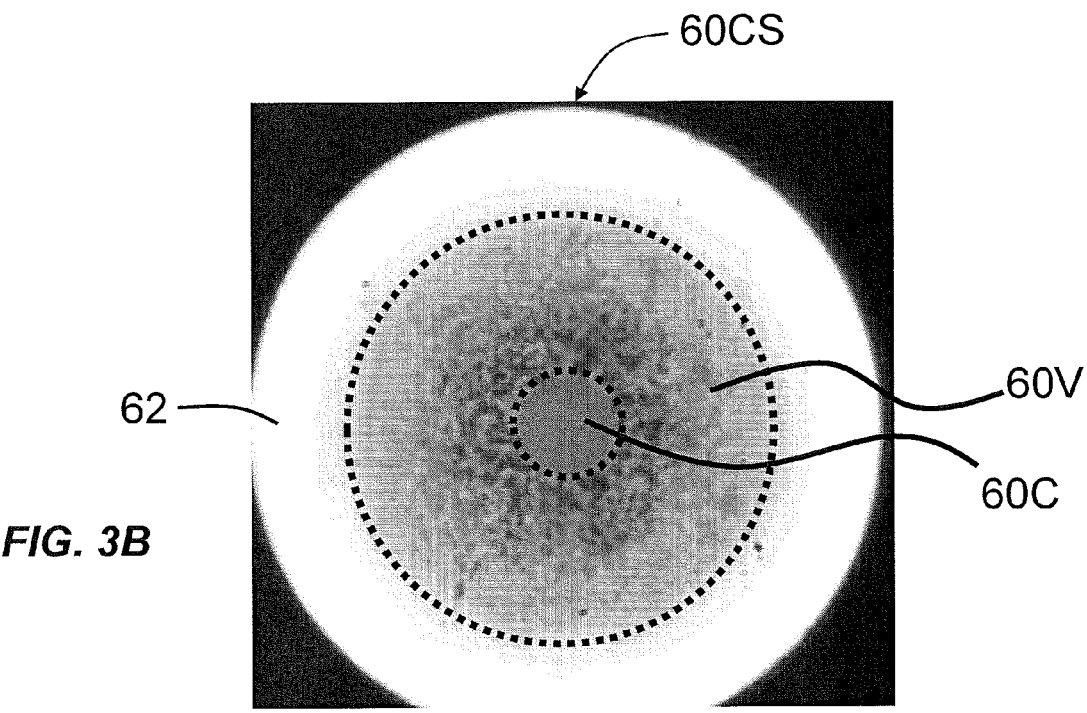
FIG. 3B and FIG. 3C are cross-sectional photographs of example light-diffusing optical fibers having different core and cladding geometries.
Figure 3C:
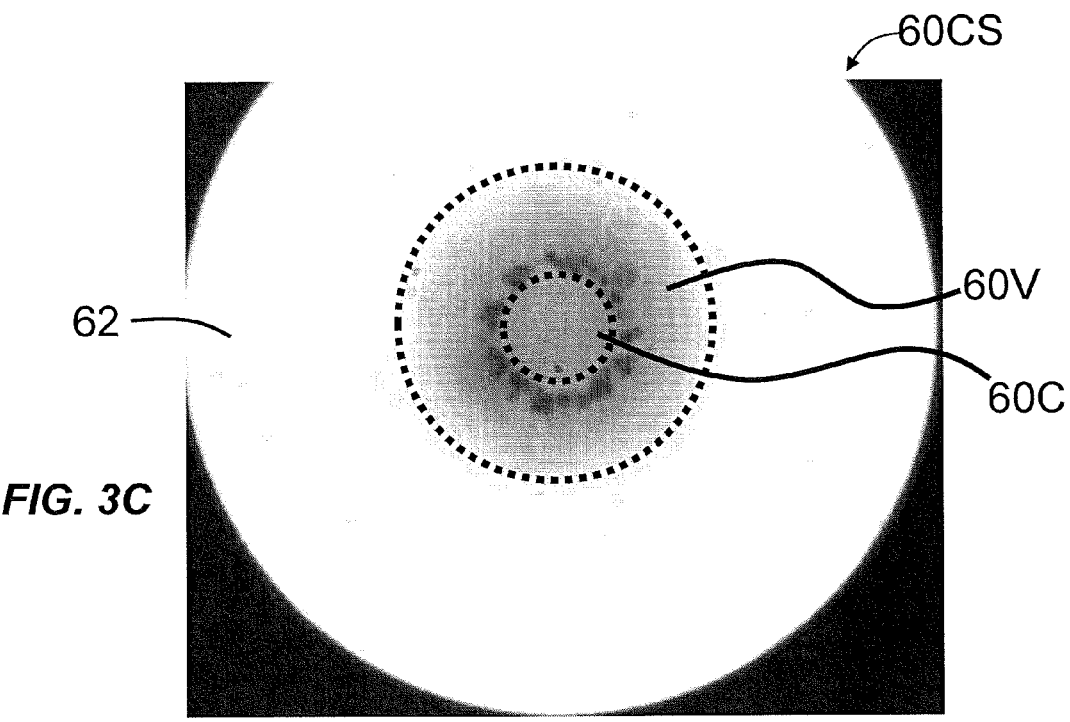

FIG. 3B and FIG. 3C are cross-sectional photographs of actual optical fiber cores 60CS illustrating two different configurations for the optical fiber center core region 60 and outer core region 62. Optical fiber core 60CS of FIG. 3B has a relatively large annular void region 60V with relatively small voids 64 and has a loss of about 1.2 dB/m. Optical fiber core 60CS of FIG. 3C has a relatively small annular void region 60V that includes relatively large voids 64 and has a loss of about 0.4 dB/m. For both of the cores 60CS shown in FIG. 3B and FIG. 3C, central and outer core regions 60 and 62 is silica and cladding 66 is a low-refractive-index polymer.

Light-diffusing optical fiber 50 can have a loss due to scattering that varies from 0.2 to 2 dB/m, depending on the particular configuration of center core region 60 and outer core region 62. However, as described in greater detail below, aspects of the disclosure involve modifying light-diffusing optical fiber 50 to obtain a greater loss, e.g., up to about 300 dB/m. Thus, in an example, light-diffusing optical fiber 50 can have a loss in the range from about 0.2 dB/m to about 300 dB/m, wherein the loss is substantially spectrally uniform in the wavelength range from 250 nm to 2,000 nm and in another example is substantially spectrally uniform over the visible wavelength or "white light" spectral range (e.g., 380 nm to 750 nm).

Figure 3D:
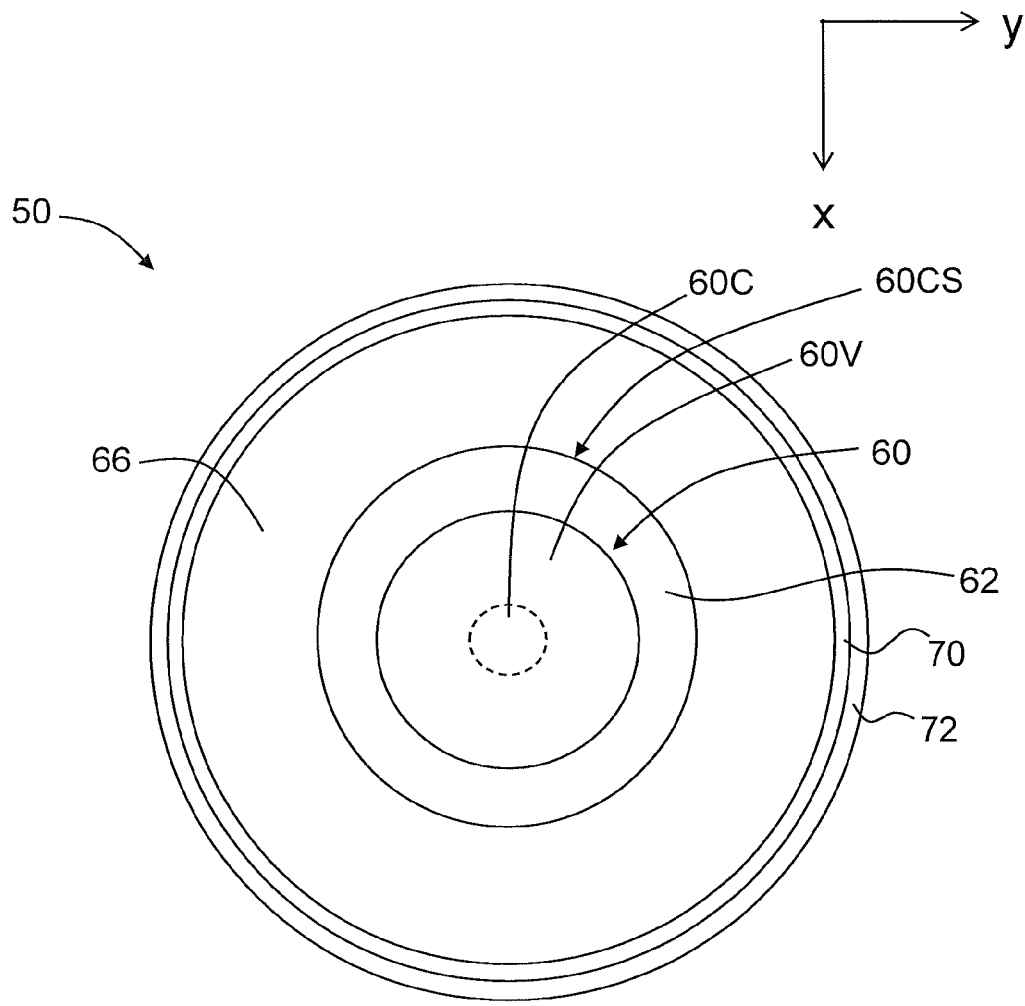
FIG. 3D is similar to FIG. 3A and illustrates another example embodiment of a light-diffusing optical fiber that includes an outer layer of light-scattering material.

FIG. 3D is similar to FIG. 3A and illustrates an example embodiment of a light-diffusing optical fiber 50. Light-diffusing optical fiber 50 of FIG. 3D includes central core region 60 having clear and void sections 60C and 60V, and outer core region 62. Cladding 66 surrounds outer core region 62. Core 60CS comprises silica, while cladding 66 is comprised of low-refractive-index polymer.

Light-diffusing optical fiber 50 further includes coating layer 70, such as acrylate polymer material serves as secondary coating surrounds cladding 66, and a light-scattering layer 72 surrounds the coating layer. Light-scattering layer 72 comprises a light-scattering material, such as phosphorous, $TiO_2$ particles, or a doped polymer such as white acrylate inks for efficient scattering in angular space (i.e., uniform angular scattering).

Figure 5A:
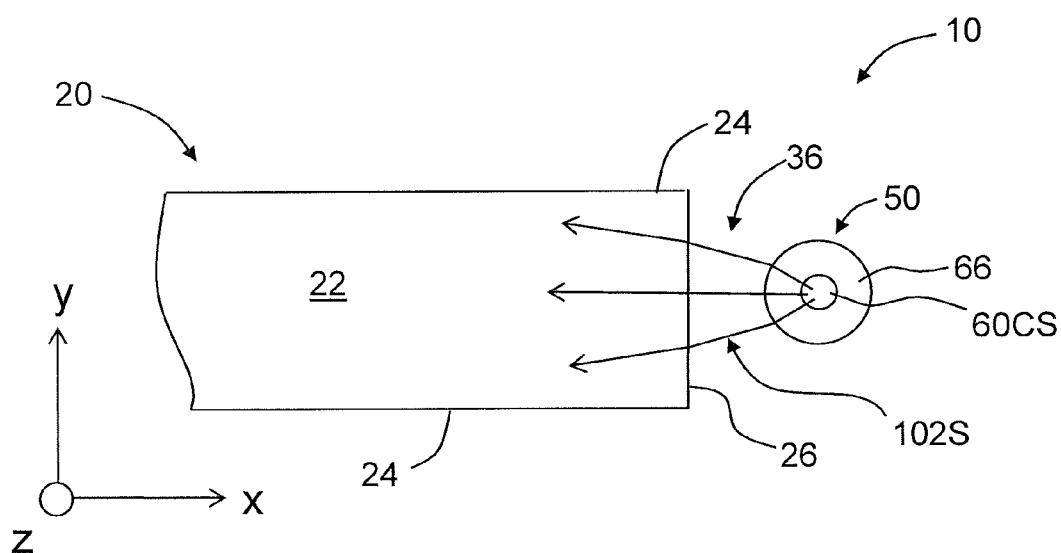
FIG. 5A is a close-up, cross-sectional view (X-Y plane) of an edge portion of the transparent sheet and the light-diffusing optical fiber operably arranged adjacent the transparent sheet edge.

With reference again to FIG. 1 and FIG. 2 and also to the cross-sectional view of FIG. 5A, light-diffusing optical fiber 50 is operably disposed adjacent edge 26 of transparent sheet 20, and can be in contact with the edge or can be spaced apart therefrom to define a gap 36. In an example, gap 36 can have a width W36 in the range from 0 mm (i.e., light-diffusing optical fiber 50 in contact with edge 26) up to 5 mm.

In the general operation of system 10, light source 100 generates light 102, which is coupled into light-diffusing optical fiber 50 at coupling end 52, thereby forming guided light 102G that travels down the light-diffusing optical fiber toward its terminal end 54. However, as guided light 102G travels down light-diffusing optical fiber 50, the light-diffusing property of the optical fiber generates diffused or scattered light 102S that leaves core 60 and (in one embodiment) exits cladding 66, thereby providing substantially continuous light emission of scattered light 102S along at least a portion of the optical fiber length.

Figure 4A:
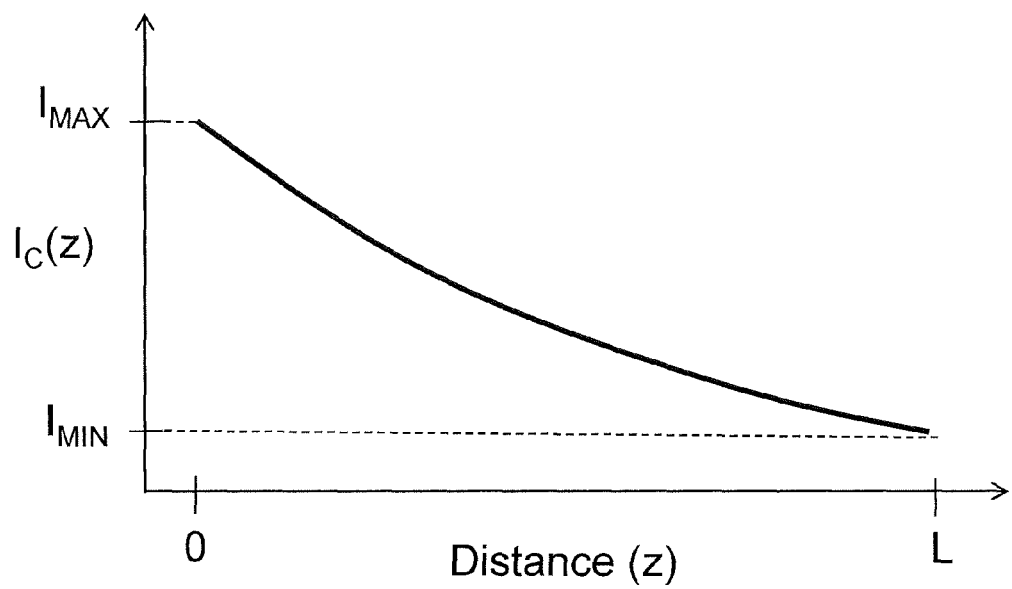
FIG. 4A is a plot of the scattered light intensity $I_S(z)$ as a function of the distance z along an example light-diffusing optical fiber from the coupling end to the terminal end, illustrating the drop in scattered light intensity due to scattering loss.

FIG. 4A is a plot of the intensity $I_C(z)$ of guided light 102G traveling in core 60 versus the distance z along the optical fiber. The intensity $I_C(z)$ monotonically decreases from a maximum value $I_{MAX}$ at the coupling end 52 of light-diffusing optical fiber 50 to a minimum value $I_{MIN}$ at terminal end 54. The intensity $I_S(z)$ of the scattered light 102S has a similar shape when the light scattering is uniform over the length of the light-scattering optical fiber 50. The shape of the plot of FIG. 4A is determined by the loss characteristics of the particular light-diffusing optical fiber 50.

Figure 4B:
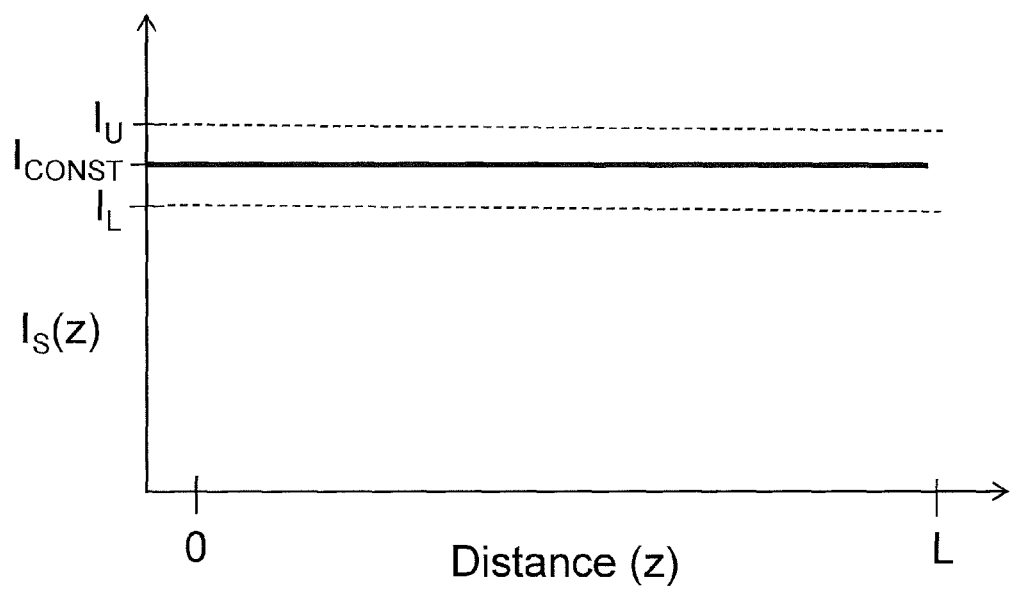
FIG. 4B is a schematic plot of the idealized intensity $I_S(z)$ of the scattered light from light-diffusing optical fiber, illustrated a desired constant intensity $I_{CONST}$ of scattered light as a function of distance z.

FIG. 4B is a schematic plot of the idealized intensity $I_S(z)$ of the scattered light 102S illustrated a desired constant intensity $I_{CONST}$ of scattered light as a function of distance z, i.e., along the length of light-diffusing optical fiber 50. In an example, $I_{CONST}$ can vary with a tolerance range, i.e., a narrow range of intensities having an upper bound $I_U$ and a lower bound $I_L$. The plot of FIG. 4B can also be the amount of scattered light 102S coupled into transparent sheet 20, so that even with a non-uniform scattered light intensity profile from light-diffusing optical fiber 50, techniques can be used to condition the scattered light before it enters transparent sheet 20. Example methods for at least partially compensating for the reduction in the intensity $I_S$ of the scattered light and the intensity $I_C$ of guided light 102G with distance along light-diffusing optical fiber 50 are described below.

In an example, the light scattering is isotropic so that a portion of scattered light 102S is directed towards transparent sheet edge 26 and is coupled into transparent sheet body 22 at the sheet edge, while the remaining portion misses the transparent sheet edge and thus is not coupled into the transparent sheet body. In the Figures, only the portion of scattered light 102S that is coupled into transparent sheet body 22 is shown for ease of illustration. The portion of scattered light 102S that is coupled into the transparent sheet body 22 can serve as illumination light for a variety of applications, including flat-screen displays, such as described in greater detail below.

Figure 5B:
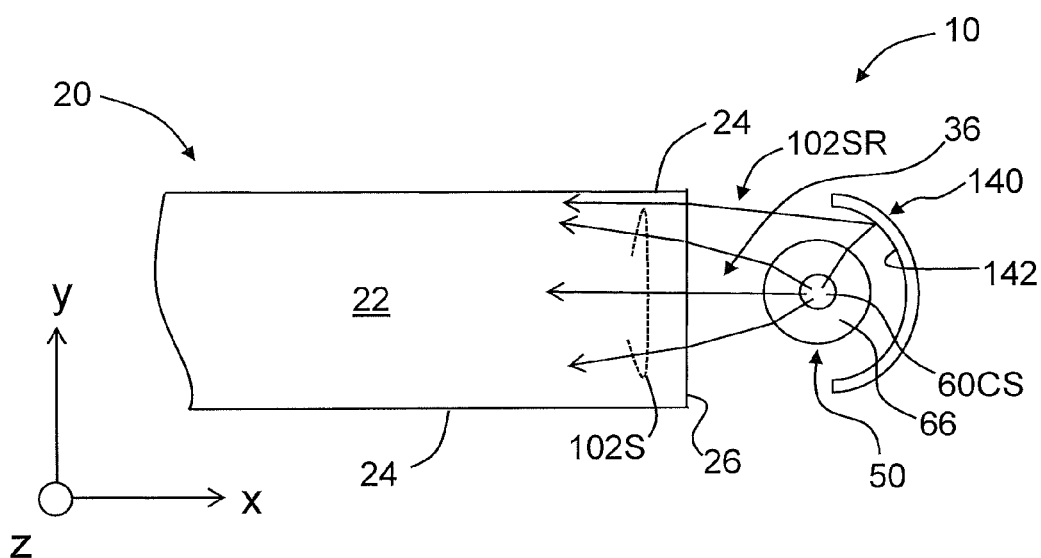
FIG. 5B is similar to FIG. 5A and further includes a reflecting member operably arranged relative to the light-diffusing optical fiber so that at least a portion of the scattered light that would not otherwise be coupled into the transparent sheet is coupled into the transparent sheet.

FIG. 5B is similar to FIG. 5A, and further includes a reflecting member 140 having a reflecting surface 142. Reflecting member 140 is disposed adjacent light-diffusing optical fiber 50 opposite transparent sheet 20. Reflecting member 140 is configured (e.g., via the shape of reflecting surface 142) to receive and reflect scattered light 102S that would otherwise miss transparent sheet 20, and direct at least a portion of this scattered light toward edge 26 of the transparent sheet as scattered and reflected light 102SR. Thus, reflecting member 140 serves to increase the amount of scattered light 102S that is coupled into transparent sheet 20 by adding at least some scattered (and reflected) light 102SR that would otherwise be lost due to the isotropic nature of the scattering process within light-diffusing optical fiber 50.

Figure 5C:
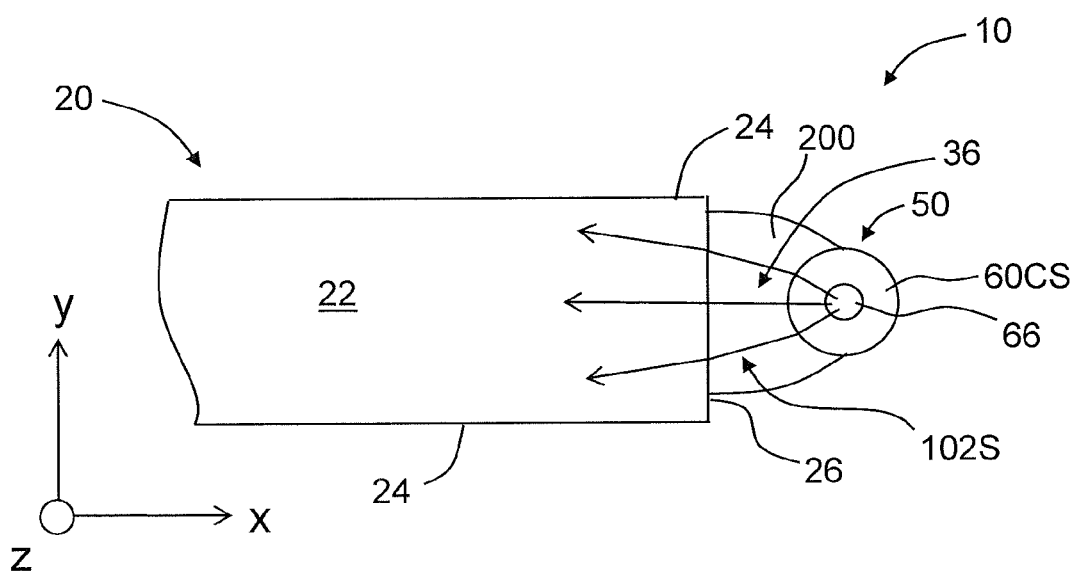
FIG. 5C is similar to FIG. 5A, and further includes an index-matching material disposed between the light-diffusing optical fiber and the transparent sheet so that the scattered light travels through the index-matching material.

FIG. 5C is similar to FIG. 5A, and further includes an index-matching material 200 disposed between light-diffusing optical fiber 50 and transparent sheet 20 so that scattered light 102S travels through the index-matching material (i.e., the index-matching material is disposed in the optical path). Index-matching material 200 has, in an example, a refractive index $n_{200}$ between that of core 60 ($n_{60}$) of light-diffusing optical fiber 50 and that of transparent sheet 20 ($n_{20}$), i.e., $(0.99) n_{60} < n_{200} < n_{20}$.

In an example, index-matching material 200 also serves to support light-diffusing optical fiber 50 relative to transparent sheet 20. In an example, index-matching material 200 has an adhesive property. An example value for n60 is 1.46 at a wavelength 550 nm, and an example value for $n_{200}$ is in the range from 1.45 to 1.55 at a wavelength of 550 nm. Example index-matching materials include a polymer-based glue, photo-curable polymers, and epoxy glues FIG. 5D is similar to FIG. 5B and illustrates an example embodiment where index-matching material 200 is used to support light-diffusing optical fiber 50 and reflecting member 140.

Figure 5D:
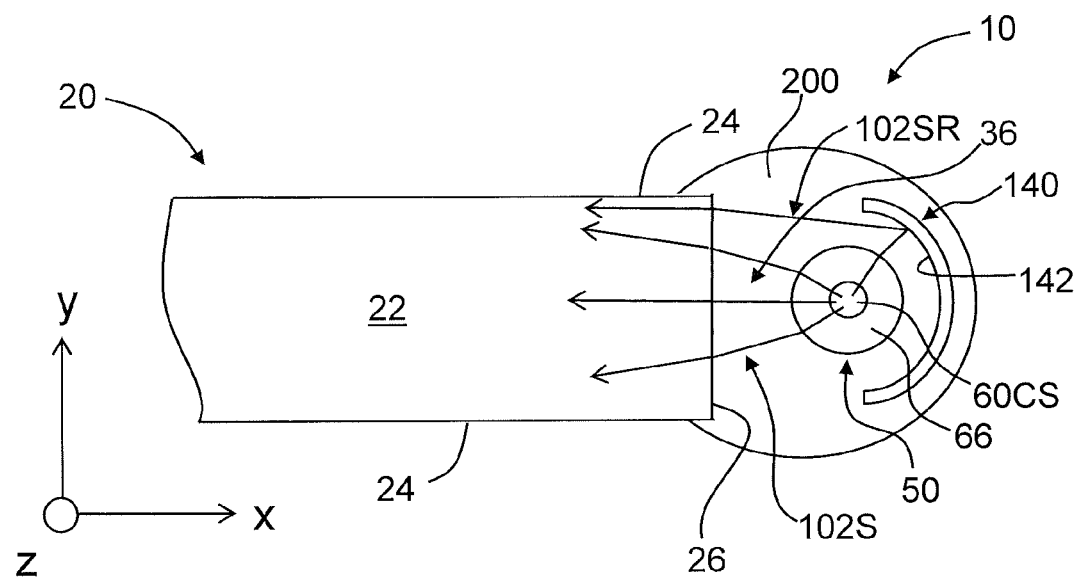
FIG. 5D is similar to FIG. 5B and illustrates an example embodiment where the index-matching material is used to support the light-diffusing optical fiber and the reflecting member.
Figure 5E:
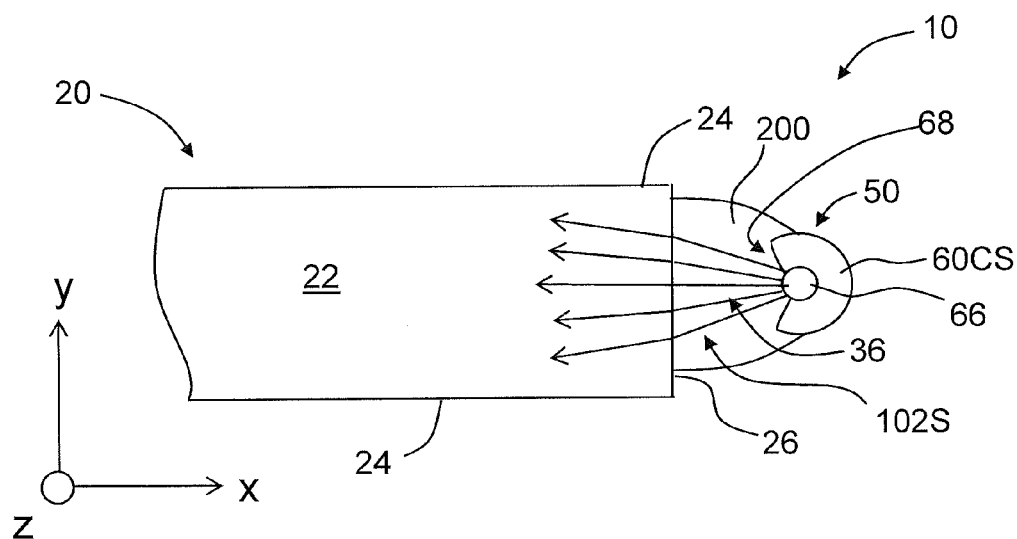
FIG. 5E is similar to FIG. 5C, and illustrates an example embodiment wherein a portion of the cladding is removed from the light-diffusing optical fiber along at least a portion of its length to define a cladding gap, with the cladding gap filled with an index-matching material.

FIG. 5E is similar to FIG. 5C, and illustrates an example embodiment wherein a portion of cladding 66 is removed from light-diffusing optical fiber 50 along at least a portion of its length so that core 60CS is exposed or the thickness of the cladding is substantially reduced. The removed portion of cladding 66 forms a gap 68 that is shown as being filled with index-matching material 200. In an example where core 60CS is exposed, silane is applied to the exposed portion of the core to protect the core surface.

The configuration illustrated in FIG. 5E increases the amount of scattered light 102S that is emitted from core 60CS of light-diffusing optical fiber 50, with the increased amount of scattered light being directed substantially radially outward from the core and into gap 68. This configuration allows for the scattering loss in light-diffusing optical fiber 50 to be relatively high, e.g., up to the aforementioned 300 dB/m.

Figure 5F:
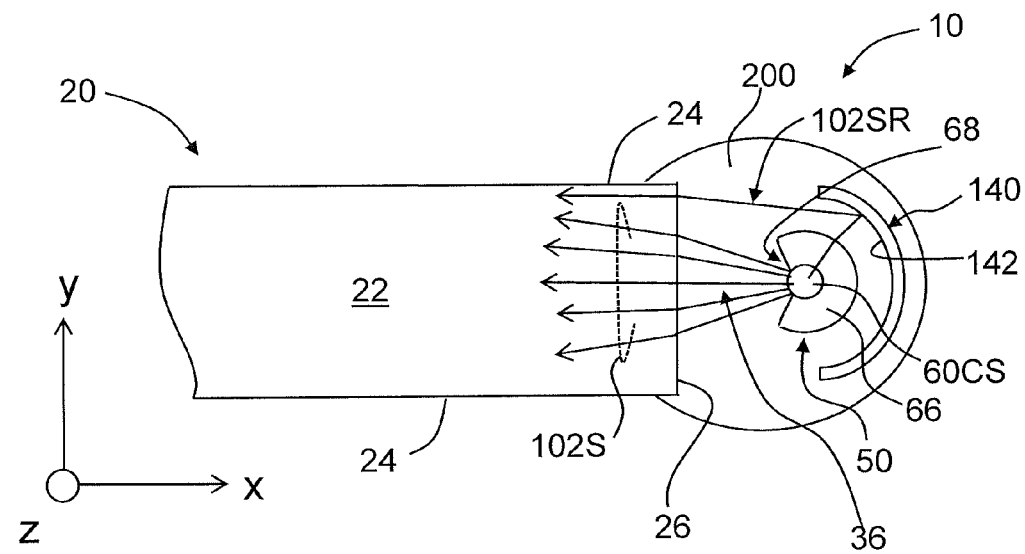
FIG. 5F is similar to FIG. 5D and illustrates an example embodiment where the light-diffusing optical fiber includes a cladding gap filled with an index-matching material.

FIG. 5F is similar to FIG. 5D and illustrates an example embodiment where light-diffusing optical fiber 50 includes gap 68 filled with index-matching material 200. Note that even though the light scattering is no longer isotropic, there is still a benefit to having reflecting member 140 reflect at least a portion of the scattered light back into transparent sheet 20.

Figure 5G:
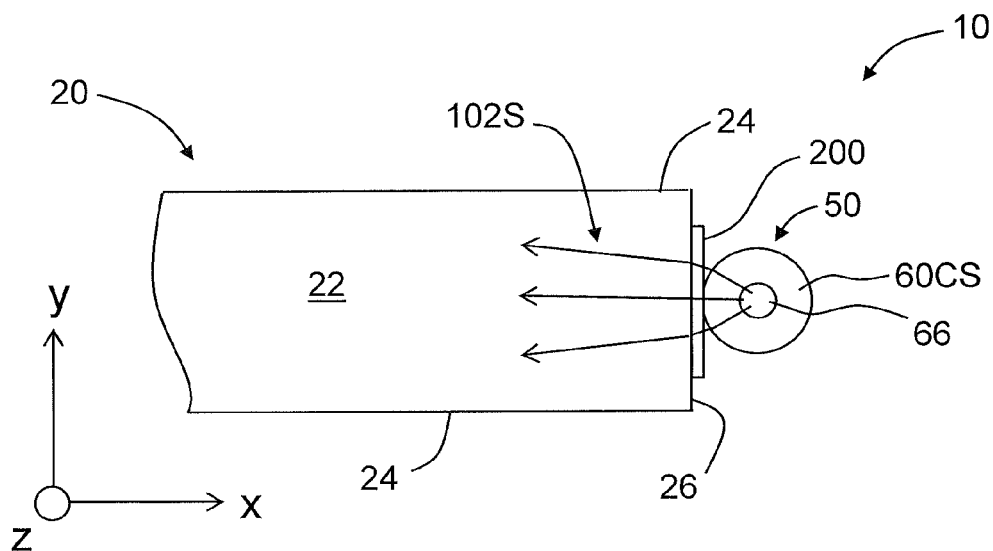
FIG. 5G is similar to FIG. 5A, and illustrates an example embodiment wherein the index-matching material is in the form of an adhesive strip applied to the edge of the transparent sheet.

FIG. 5G is similar to FIG. 5A, and illustrates an example embodiment wherein index-matching material 200 is in the form of an adhesive strip applied to edge 26 of transparent sheet 20. Index-matching adhesive strip 200 serves to support light-diffusing optical fiber 50 relative to edge 26 and also serves the above-described index-matching function that enhances the coupling of scattered light 102S into transparent sheet body 22.

Figure 5H:
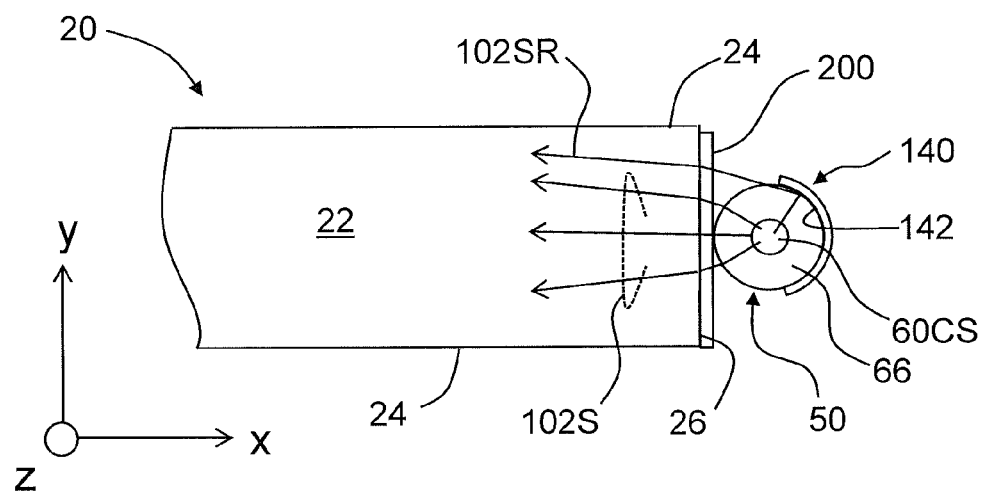
FIG. 5H is similar to FIG. 5G and further includes a reflective member operably disposed directly on a portion of the cladding.

FIG. 5H is similar to FIG. 5G and further includes reflective member 140 operably disposed directly on a portion of cladding 66 opposite transparent sheet 20. In an example, reflective member 140 comprises reflective tape or a reflective film deposited onto the cladding portion.

Figure 5I:
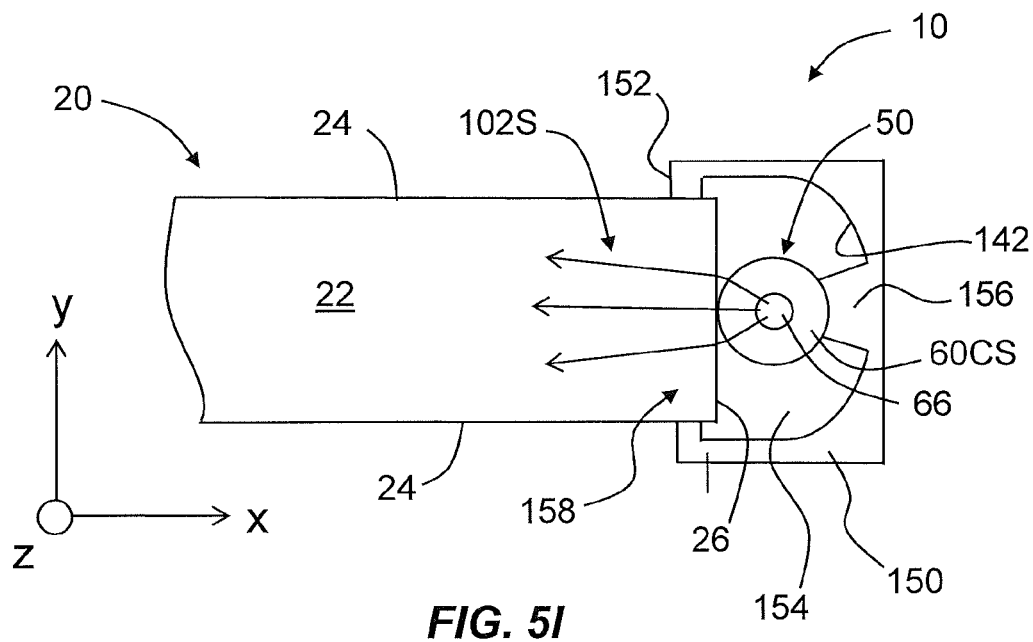
FIG. 5I and FIG. 5J are similar to FIG. 5G, and illustrate example embodiments that include a support member configured to support the light-diffusing optical fiber relative to the transparent sheet.

FIG. 5I is similar to FIG. 5G, and illustrates an example embodiment that includes a support member 150 configured to support light-diffusing optical fiber 50 relative to transparent sheet 20. Support member 150 has a front end 152 and an internal cavity 154 open at front end 152. In an example, cavity 154 includes a reflective rear surface 142 that can be curved as shown, or can be planar. In an example, support member 150 is a unitary structure formed by molding. In an example, support member 150 includes a support mount or stem 156 to which light-diffusing optical fiber 50 can be mounted. Also in an example, support member 150 can be configured to support multiple light-diffusing optical fibers 50.

Figure 5J:
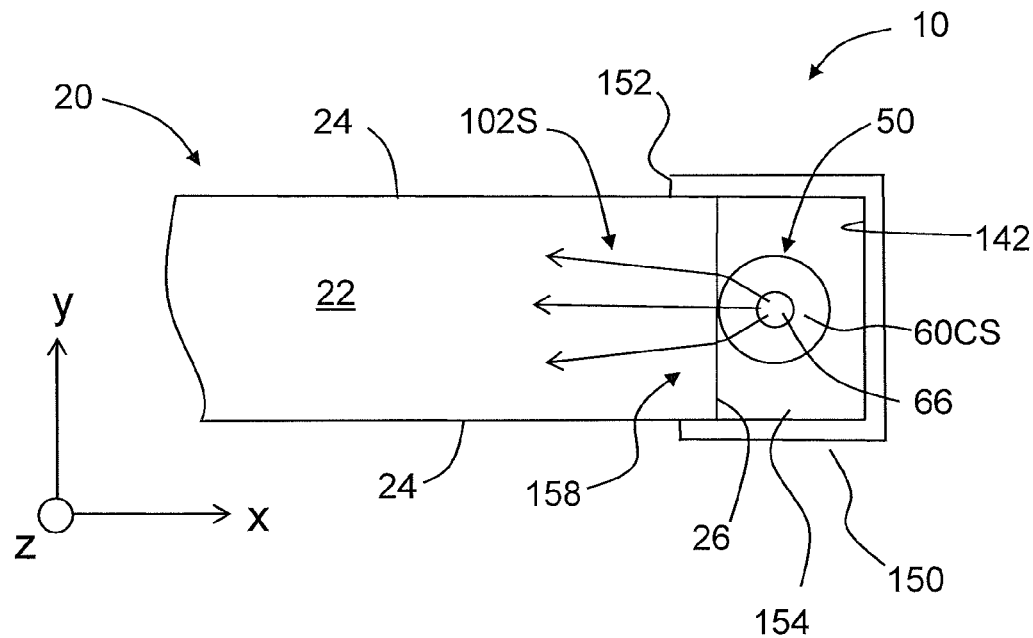

In an example, front end 152 of support member 150 defines an aperture 158 sized to the thickness TH20 of transparent sheet 20 so that support member 150 can slidingly and snugly engage the edge portion 26 of the transparent sheet by gripping top and bottom surfaces 24. In an example, front end 152 is compliant to facilitate gripping top and bottom surfaces 24 of transparent sheet 20. FIG. 5J is similar to FIG. 5I and illustrates an example support member 150 formed, for example, using reflective tape.

Figure 5K:
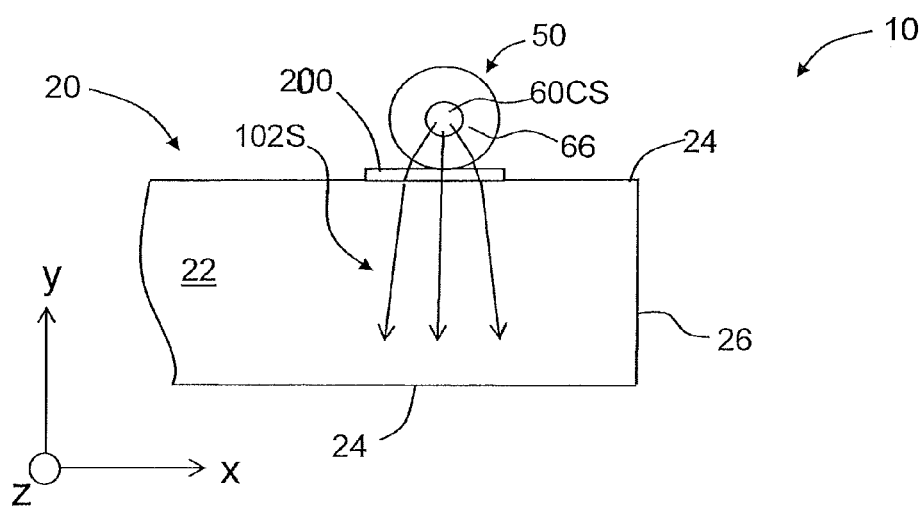
FIG. 5K is similar to FIG. 5G, except that the index-matching adhesive strip and the light-diffusing optical fiber reside adjacent the top surface of the transparent sheet.
Figure 5L:
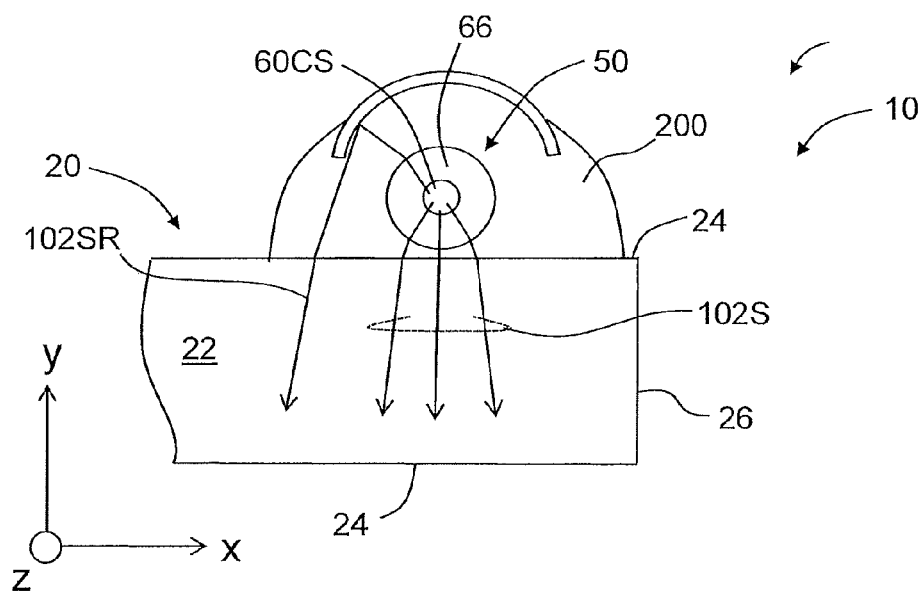
FIG. 5L is similar to FIG. 5K, with the index-matching material supporting both the light-diffusing optical fiber and an operably arranged reflecting member.

FIG. 5K is similar to FIG. 5G, except that index-matching adhesive strip 200 and light-diffusing optical fiber 50 reside adjacent top surface 24 of transparent sheet 20. FIG. 5L is similar to FIG. 5K, except that index-matching material 200 is used to support both light-diffusing optical fiber 50 and reflecting member 140.

Figure 5M:
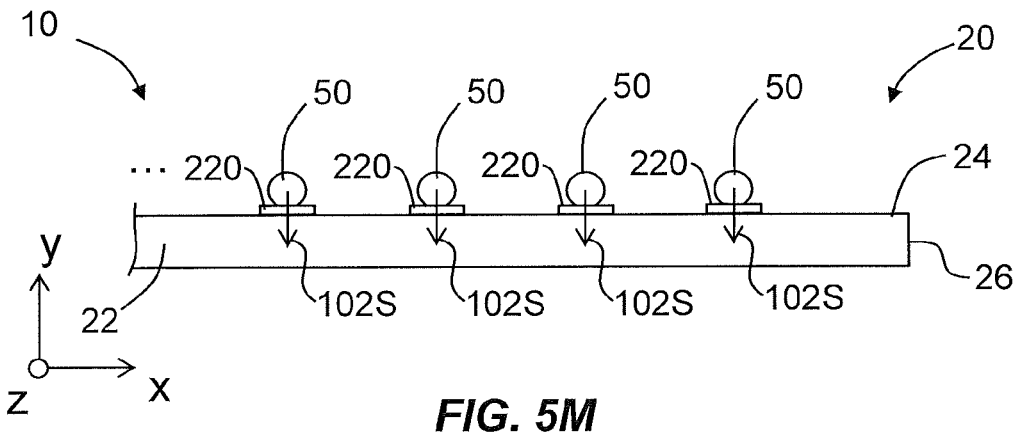
FIG. 5M is similar to FIG. 5K, and illustrates multiple light-diffusing optical fibers adhered to the transparent sheet top surface.

FIG. 5M is similar to FIG. 5K, and illustrates multiple light-diffusing optical fibers 50 adhered to transparent sheet top surface 24 via respective index-matching adhesive strips 200. In an alternative example, a single index-matching adhesive strip 200 can be employed. This configuration provides multiple locations for coupling scattered light 102S into transparent sheet body 22 via top surface 24.

Figure 5N:
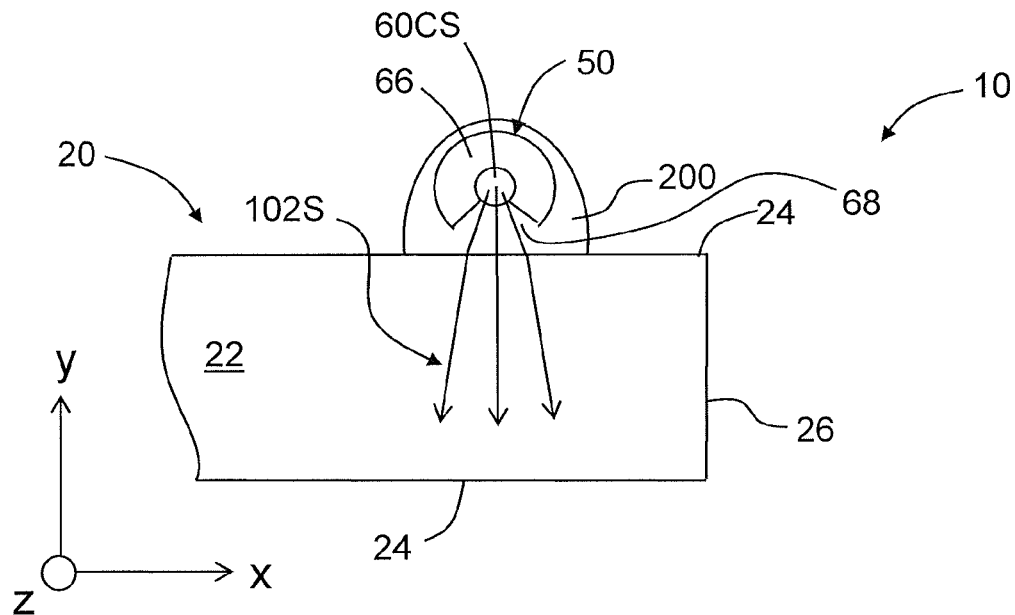
FIG. 5N is similar to FIG. 5L, except that there is no reflecting member, and a light-diffusion optical fiber has a cladding gap.

FIG. 5N is similar to FIG. 5L, except that there is no reflecting member 140, and a portion of cladding 66 has been removed to form a cladding gap 68 as discussed above. This configuration allows for scattered light 102S to exit light-diffusing optical fiber 50 at cladding gap 68 and enter transparent sheet body 22 from upper surface 24.

Figure 5O:
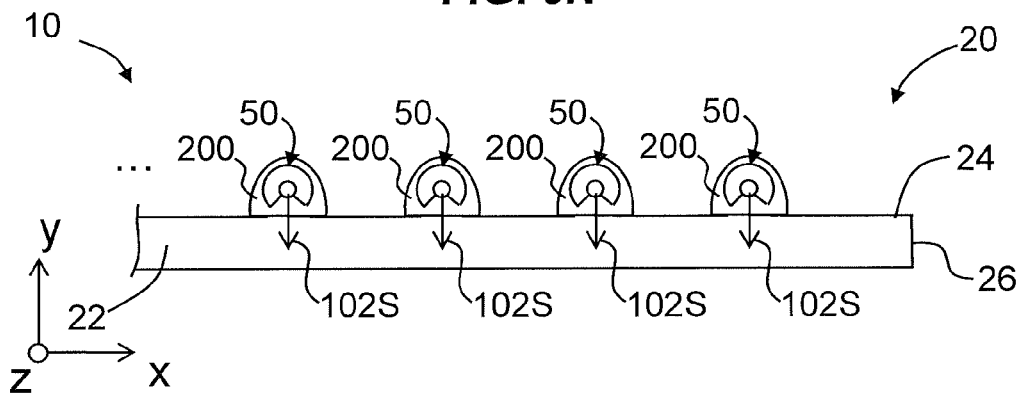
FIG. 5O is similar to FIG. 5K, and illustrates multiple light-diffusing optical fibers as configured in FIG. 5M adhered to the transparent sheet top surface.

FIG. 5O is similar to FIG. 5K and FIG. 5M, and illustrates multiple light-diffusing optical fibers 50 adhered to transparent sheet top surface 24 via respective index-matching material portions 200. In an alternative example, a single index-matching layer 200 can be employed. This configuration provides another method of providing multiple locations for coupling scattered light 102S into transparent sheet body 22 via top surface 24.

Figure 6A:
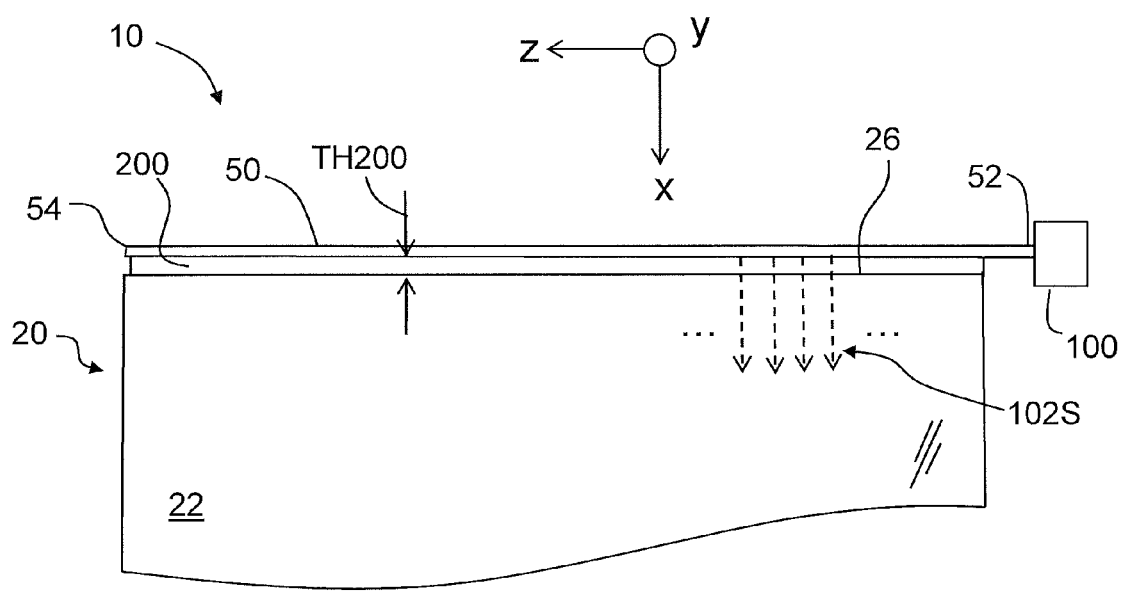
FIG. 6A is similar to FIG. 1 and illustrates an example embodiment wherein index-matching material has an index of refraction $n_{200}$ that varies as a function of distance z along the light-diffusing optical fiber.
Figure 6B:
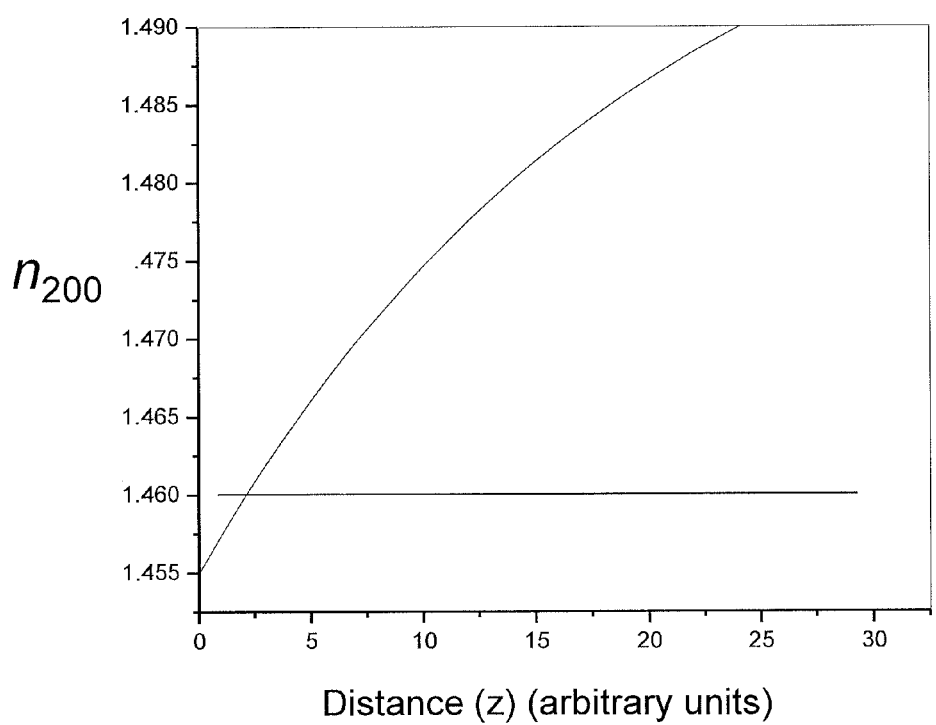
FIG. 6B is a plot of an example profile of the index of refraction $n_{200}$ of the index-matching material versus the distance z along the light-diffusing optical fiber.

FIG. 6A is similar to FIG. 1 and illustrates an example embodiment wherein index-matching material 200 has an index of refraction $n_{200}$ that varies as a function of distance z (i.e., distance along the light-diffusing optical fiber 50) that at least partially compensates for the decrease in the intensity $I_S$ of scattered light 102S from the light-diffusing optical fiber 50. FIG. 6B is a plot of an example profile of index of refraction $n_{200}$ versus distance z. The thickness TH200 of the index-matching material 200 is about 10 microns. The (effective) refractive index of core 60 is 1.46, as indicated by the solid horizontal line in the plot. Transparent sheet 20 is made of glass having a refractive index $n_{20}$=1.5. The varying refractive index profile for the index-matching material 200 has a value of just below the core index at or near the coupling end 52 of light-diffusing optical fiber 50, and increases to a value of 1.49 towards the terminal end 54. As the refractive index of the index-matching material 200 increases, and increasing amount of light is scattered from core 60. This serves to at least partially counteract the diminished amount of light scattering with distance inherent in light-diffusing optical fiber 50.

Figure 6C:
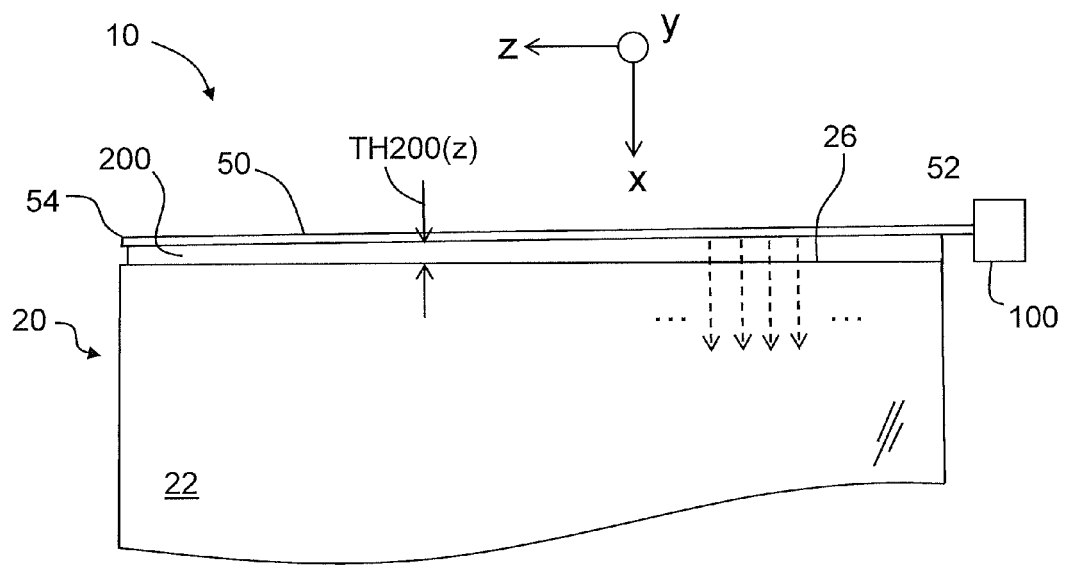
FIG. 6C and FIG. 6D are similar to FIG. 6A and illustrate example embodiments where the thickness of the index-matching material varies with distance z along the optical fiber.
Figure 6D:
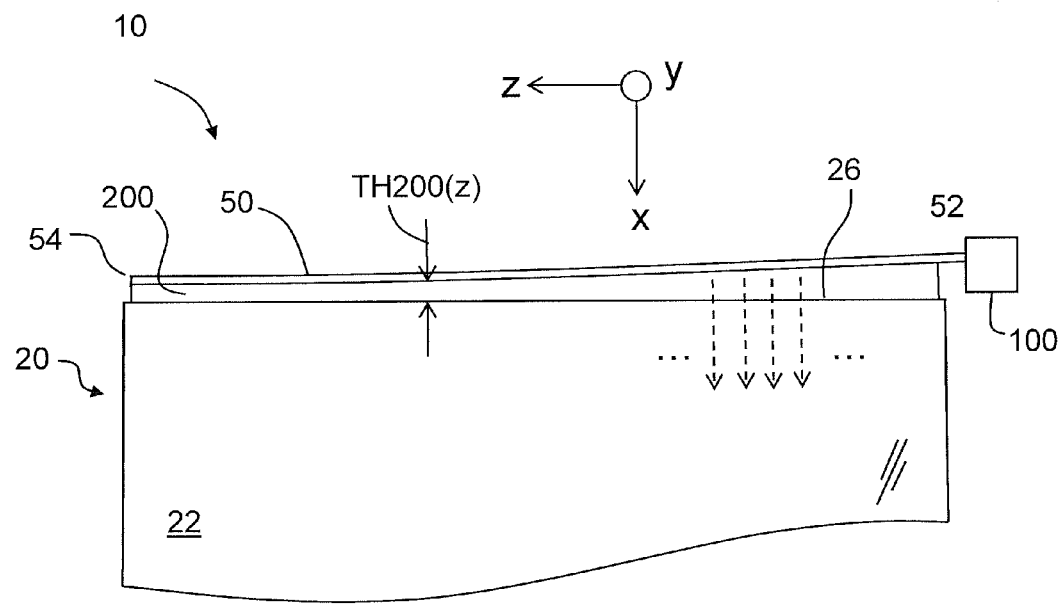

FIG. 6C and FIG. 6D are similar to FIG. 6A and illustrate example embodiments where the thickness TH200 of index-matching material 200 varies with distance (z), i.e., TH200=TH200(z). A greater thickness TH200 corresponds to a greater amount of attenuation of scattered light 102S. Thus, at or near coupling end 52 of light-diffusing optical fiber 50, TH200(z) is thickest and monotonically decreases to a minimum thickness at or near terminal end 54. FIG. 6C illustrates a linearly varying thickness profile TH200(z) while FIG. 6D illustrates a curved thickness profile TH200(z). The particular thickness profile TH200(z) is determined by the loss characteristics of light-diffusing optical fiber 50.

In an example embodiment, thickness profile TH200(z) is configured to substantially compensate for the variation in intensity $I_S$ of the scattered light 102S with distance along light-diffusing optical fiber 50 so that the scattered light intensity is substantially uniform along the length of the light-diffusing optical fiber.

In another example embodiment, light-diffusing optical fiber 50 is configured so that the scattered light intensity $I_S$ is substantially constant as a function of distance along the light-diffusing optical fiber. This can be accomplished, for example, by changing the temperature during the optical fiber drawing process, which serves to change the size of voids 64 in core void region 60V. The smaller voids 64, the greater the loss in the optical fiber 50. Thus, in an example embodiment, light-diffusing optical fiber 50 is configured so that it emits scattered light 102S with substantially constant intensity IS over at least a portion of its length. Example methods of forming such a light-diffusing optical fiber 50 are disclosed in U.S. patent application Ser. No. 12/950,045, which application is incorporated by reference herein. Example methods of forming optical fibers with randomly arranged voids are disclosed in U.S. Pat. No. 7,450,806, which patent is incorporated by reference herein.

Figure 6E:
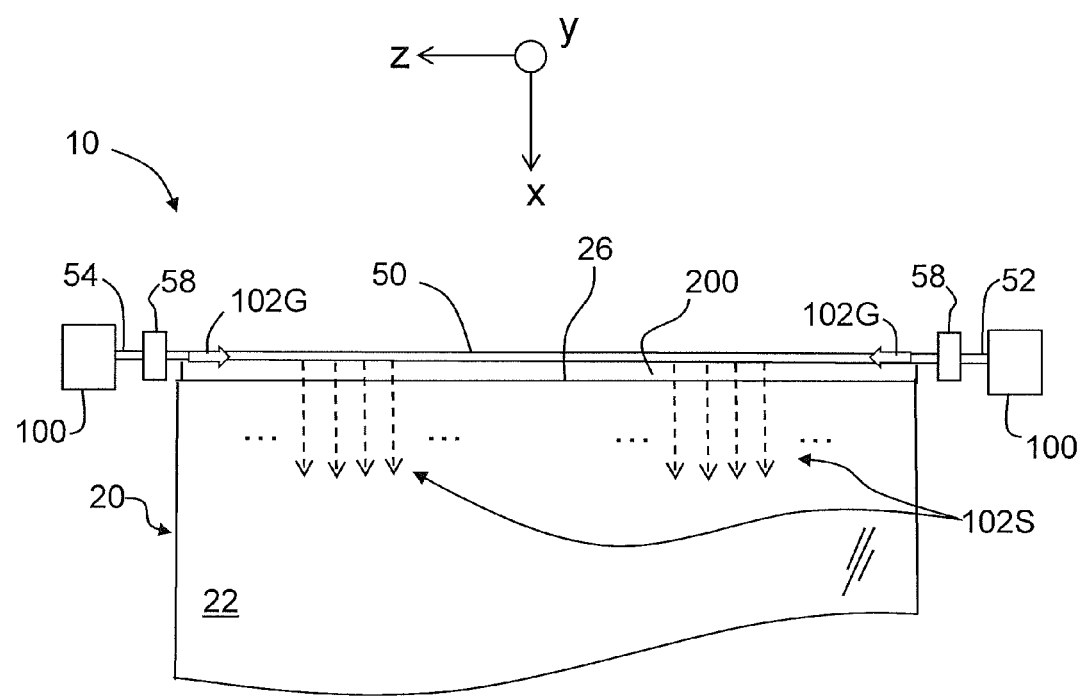
FIG. 6E is similar to FIG. 6A and illustrates an example embodiment where the light-diffusing optical fiber is optically coupled to two light sources.

FIG. 6E is similar to FIG. 6A and illustrates an example embodiment where light-diffusing optical fiber 50 is optically coupled to two light sources 100 at respective ends 52 and 54. Optical isolators 58 are optionally employed adjacent each light source 100 to prevent light from entering light sources 100. The symmetry of this two-source configuration results in substantially uniform intensity $I_S$ of scattered light 102S.

Figure 6F:
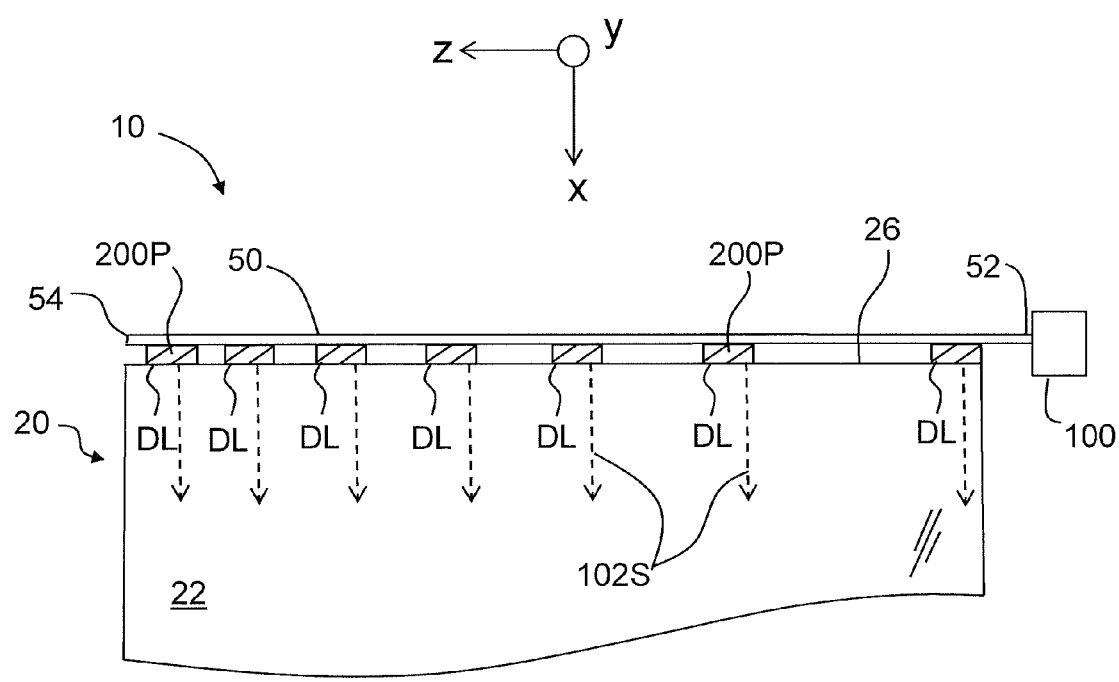
FIG. 6F is similar to FIG. 6A and illustrates an example embodiment where the index-matching material (shown in cross-hatch for ease of viewing) is not continuous and is provided in discrete portions at discrete locations between the light-diffusing optical fiber and the transparent sheet.

FIG. 6F is similar to FIG. 6A and illustrates an example embodiment where the index-matching material 200 (shown now in cross-hatch for ease of viewing) is not continuous and light diffusing optical fiber 50 is optically coupled to (an in one example, attached to) transparent sheet 20 (e.g., at edge 26, as shown) using a number of portions 200P of index-matching material 200 at a number of discrete locations DL. In an example, the density of the discrete locations DL where index-matching material portions 200P resides changes along the length of light-diffusing optical fiber 50 from input end 52, with a relatively low density at coupling end 52 and relatively high density at terminal end 54. The portions 200P of index-matching material 200 at each discrete location DL are shown in one embodiment as being essentially the same for ease of illustration. However, different sized portions 200P of index-material material 200 can also be used at different discrete locations DL. In an example, the particular configuration of index-matching material portions 200P and discrete locations DL is selected to provide for substantially uniform amounts of scattered light 102S entering transparent sheet body 22 along the length of the light-diffusing optical fiber 50.

Figure 7A:
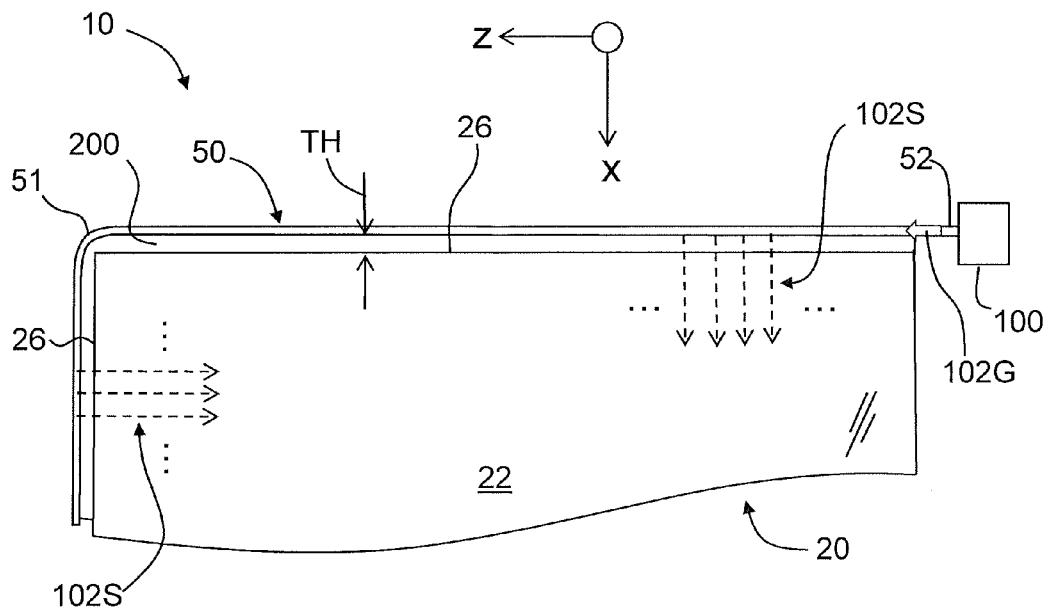
FIG. 7A is similar to FIG. 6A, and illustrates an embodiment wherein the light-diffusing optical fiber includes a bend that allows the optical fiber to reside adjacent two edges of the transparent sheet.

FIG. 7A is similar to FIG. 6A, and illustrates an embodiment of system 10 wherein light-diffusing optical fiber 50 includes a bend 51 that allows the optical fiber to reside adjacent two edges 26 as shown. This allows for scattered light 102S to enter the different sides, thereby coupling more light into transparent sheet 20.

Figure 7B:
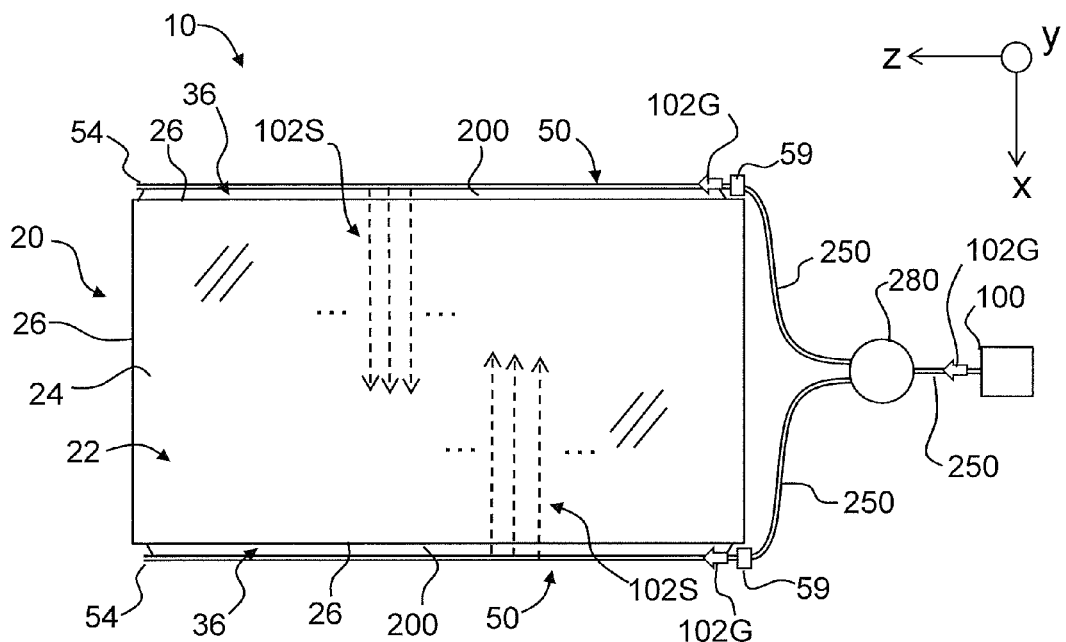
FIG. 7B is similar to FIG. 7A and illustrates an example embodiment that employs multiple light-diffusing optical fibers along different edges of the transparent sheet.

FIG. 7B is similar to FIG. 7A and illustrates an example embodiment of system 10 that employs multiple light-diffusing optical fibers 50 along different edges 26 of transparent sheet 20. System 10 of FIG. 7B employs three sections of non-light-diffusing optical fiber 250. A first section of optical fiber 250 optically connects light source 100 to a 1×2 coupler 280. The second and third sections of optical fiber 250 optically connect the optical coupler 280 to first and second light-diffusing optical fibers 50 on opposite edges 26 of transparent sheet 20. In an example, the second and third sections of optical fiber 250 are optically connected to the respective light-diffusing optical fibers 50 via splicing members 59, which can be mechanical connectors.

Figure 7C:
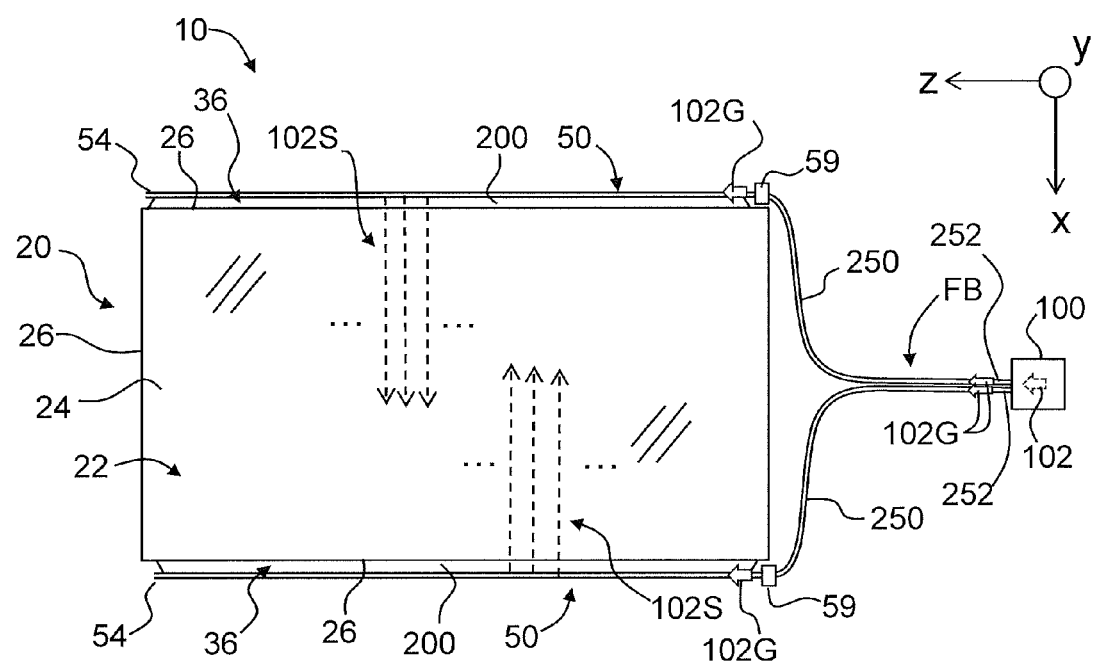
FIG. 7C is similar to FIG. 7B and illustrates an example embodiment where the ends of the non-light-diffusing optical fibers are brought together to form a fiber bundle.

In an alternate embodiment illustrated in FIG. 7C, rather than use a single optical fiber and a circular, the two optical fibers 250 are brought together as an optical fiber bundle FB at light source 100 and light 102 is coupled directly into the two optical fiber ends 252. Likewise, multiple light sources 100 can be used, one for each optical fiber 250 in the optical fiber bundle FB.

Figure 7D:
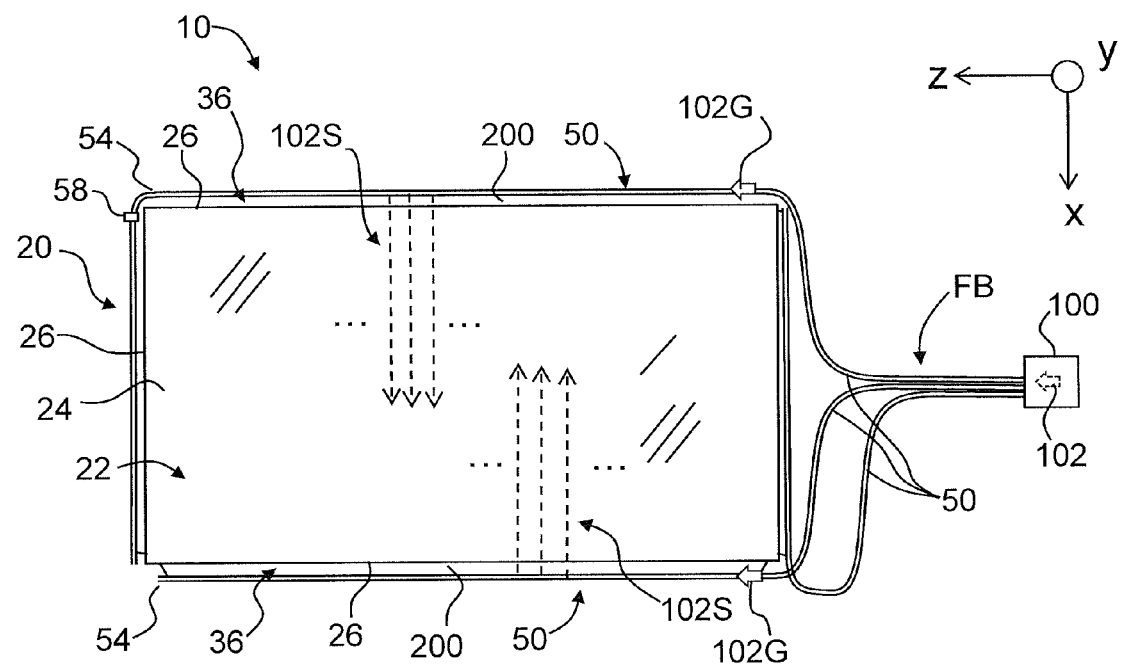
FIG. 7D illustrates an embodiment similar to FIG. 7C where three light-diffusing optical fibers and one non-light-diffusing optical fiber converge to form a fiber bundle, and where four light-diffusing optical fibers reside adjacent respective edges of the transparent sheet.

Generally speaking, optical fiber bundle FB can include non-light-diffusing optical fibers 250, light-diffusing optical fibers 50, or a combination thereof, with two or more light-diffusing optical fibers 250 arranged adjacent corresponding respective edges 26 and/or surfaces 24 of transparent sheet 20. FIG. 7D illustrates an embodiment similar to FIG. 7C where three light-diffusing optical fibers 50 and one optical fiber 250 converge to form fiber bundle FB, and where four light-diffusing optical fibers reside adjacent respective edges 26 of transparent sheet 20.

Figure 8:
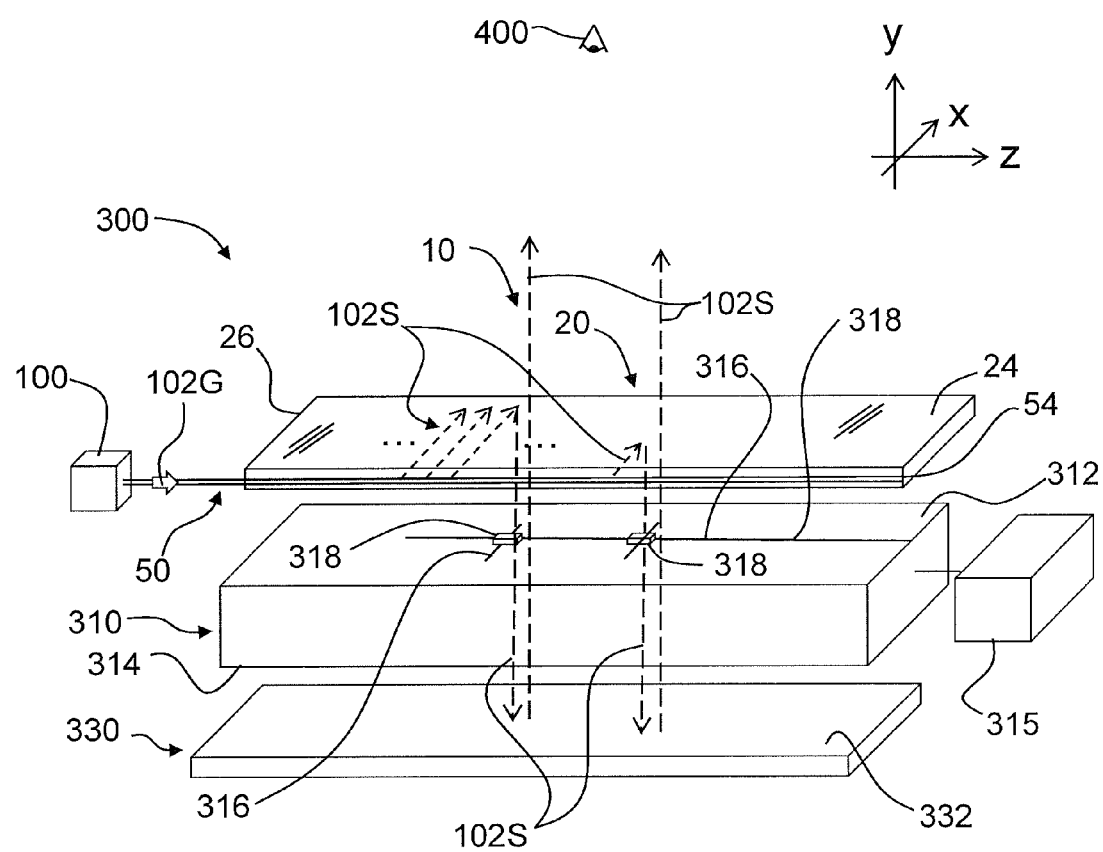
FIG. 8 is an exploded elevated view of an example flat-screen device that includes the light-coupling system of the disclosure.

FIG. 8 is an exploded elevated view of an example flat-screen device 300 that includes system 10 of the present disclosure. Flat-screen device 300 includes a light-modulation display assembly 310 having a top surface 312 and a bottom surface 314. Light-modulation display assembly 310 is electrically connected to light-modulation electronics 315. Transparent sheet 20 resides on or adjacent top surface 312 of light-modulation display assembly 310. In an example, light-modulation display assembly 310 includes a plurality of pixels 316 that are addressable by light-modulation electronics 315 via transparent electrical connections 318. Transparent electrical connections 318 typically have a grid-like configuration (e.g., of source and gate bus lines), and only select electrical connections are illustrated for ease of illustration. An example light-modulation display assembly is a liquid-crystal display assembly that includes a liquid-crystal matrix that defines an array of liquid-crystal cells (pixels) sandwiched by cross-polarizers. An example reflective liquid-crystal display assembly is disclosed in U.S. Pat. No. 6,404,471, which is incorporated by reference herein.

Flat-screen device 300 also includes a reflecting member 330 that includes a reflective surface 332. Reflecting member 330 resides adjacent light-modulation assembly bottom surface 314.

In the operation of flat-screen device 300, scattered light 102S is coupled into transparent sheet 20, say at edge 26 in the manner described above. Scattered light 102S is then re-directed by transparent sheet 20, e.g., by scattering from rough surface 24, to travel through light-modulation display assembly 310. This scattered light 102S is reflected by reflecting surface 332 of reflecting member 300 to travel back through light-modulation display assembly 310 where it exits transparent sheet 20 and is seen by a viewer 400. Thus, scattered light 102S is modulated by passing twice through light-modulation display assembly 310, with the modulation determined by the operation of light-modulation electronics 315. The result is a display image that is visible to viewer 400.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

I claim:

1. A system for coupling light into a transparent sheet having an edge and a surface, comprising:
   a light source that generates light; and
   a light-diffusing optical fiber optically coupled to the light source and disposed adjacent the transparent sheet, the light-diffusing optical fiber having a silica based glass core with core diameter <300 µm, a cladding and a length, the silica based glass core having randomly arranged voids configured to provide substantially continuous light emission from the core and out of the cladding and into the transparent sheet,
   a refractive index-matching material disposed between the light-diffusing optical fiber and the transparent sheet such that the light enters the transparent sheet through at least a portion of the index-matching material, wherein the index matching material includes at least one of:
   a) a spatial variation in refractive index;
   b) discrete portions disposed at discrete locations along the light-diffusing optical fiber; and
   c) a variation in thickness as a function of length along the light-diffusing optical fiber.

2. An optical display, comprising:
   system of claim 1; and
   a light-modulating display assembly having a top surface and a bottom surface;
   a reflecting member arranged adjacent the bottom surface; and
   the transparent sheet arranged adjacent the top surface so that the light coupled into the transparent sheet being configured to direct the scattered light to the light-modulating display assembly.

3. A system for coupling light into a transparent sheet having an edge and a surface, comprising:
   a light source that generates light;
   at least one light-diffusing optical fiber optically coupled to the light source, the at least one light-diffusing optical fiber having a core, a cladding and a length, with at least a portion of the core comprising randomly arranged voids configured to provide substantially continuous light emission from the core and out of the cladding along at least a portion of the length; and
   the transparent sheet, with the portion of the at least one optical fiber arranged adjacent at least one of the edge and the surface so that light from the optical fiber portion enters the transparent sheet, further comprising an index-matching material disposed along at least a portion of the length of the at least one light-diffusing optical fiber and between the light-diffusing optical fiber and the transparent sheet, with the index-matching material having a refractive index $n_{200}$, the transparent sheet having a refractive index $n_{20}$ and the optical fiber core having a refractive index $n_{60}$, and wherein $(0.99) n_{60} < n_{200} < n_{20}$.

4. The system of claim 3, further comprising the index matching material configured to have at least one of:
   a) the refractive index varying as a function of length of the at least one light-diffusing optical fiber;
   b) a varying thickness as a function of the length of the at least one light-diffusing optical fiber, and
   c) a number of discrete portions at discrete locations along length of the at least one light-diffusing optical fiber.

5. The system of claim 3, further comprising the at least one light-diffusing optical fiber having a portion of the cladding removed so that a portion of the optical fiber core is in optical communication with the transparent sheet through the index-matching material.

6. The system of claim 3, wherein the index-matching material serves as an adhesive.

7. The system of claim 3, wherein the substantially continuous light emission is substantially wavelength-independent over a wavelength range from 250 nm to 2000 nm.

8. The method of claim 3, further comprising supporting the at least light-diffusing optical fiber with a support member that attaches to the transparent sheet.

9. The method of claim 3, further comprising operably disposing a reflecting member relative to the at least one light-diffusing optical fiber to direct light from the at least one light-diffusing optical fiber into the transparent sheet.

10. A method of coupling light into a transparent sheet having an edge and a surface, comprising:
    disposing at least a portion of at least one light-diffusing optical fiber adjacent at least one of the edge and the surface of the transparent sheet, the at least one light-diffusing optical fiber having a core, a cladding and a length, with at least a portion of the core comprising randomly arranged voids configured to provide substantially continuous light emission from the core and out of the cladding along at least a portion of the length of the light-diffusing optical fiber; and
    sending light down the at least one light-diffusing optical fiber so that light from said portion enters the transparent sheet, further comprising disposing an index-matching material between the optical fiber portion and the transparent sheet so that light from the at least one light-diffusing optical fiber that enters the transparent sheet travels through the index-matching material-configuring the index matching material to have at least one of:
    a) the refractive index varying as a function of the length of the at least one light-diffusing optical fiber;
    b) a varying thickness as a function of the length of the at least one light-diffusing optical fiber; and
    c) a number of discrete portions at discrete locations along length of the at least one light-diffusing optical fiber.

11. The method of claim 10, further comprising removing a portion of the cladding so that the core is in optical communication with the transparent sheet through the index-matching material.

12. The method of claim 10, wherein the substantially continuous light emission is substantially wavelength-independent over a wavelength range from 250 nm to 2,000 nm.

* * * * *